US011939797B2

(12) United States Patent
Taga

(10) Patent No.: US 11,939,797 B2
(45) Date of Patent: Mar. 26, 2024

(54) DOOR LOCK DEVICE

(71) Applicant: MITSUI KINZOKU ACT CORPORATION, Kanagawa (JP)

(72) Inventor: Takao Taga, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 366 days.

(21) Appl. No.: 17/441,218

(22) PCT Filed: Jan. 27, 2020

(86) PCT No.: PCT/JP2020/002696
§ 371 (c)(1),
(2) Date: Sep. 20, 2021

(87) PCT Pub. No.: WO2020/195100
PCT Pub. Date: Oct. 1, 2020

(65) Prior Publication Data

US 2022/0154497 A1 May 19, 2022

(30) Foreign Application Priority Data

Mar. 22, 2019 (JP) ................................ 2019-055057

(51) Int. Cl.
*E05B 77/06* (2014.01)
*E05B 77/32* (2014.01)
*E05B 79/08* (2014.01)

(52) U.S. Cl.
CPC .............. *E05B 77/06* (2013.01); *E05B 77/32* (2013.01); *E05B 79/08* (2013.01)

(58) Field of Classification Search
CPC .......... E05B 77/02; E05B 77/04; E05B 77/06; E05B 77/32; E05B 77/12; E05B 77/245; E05B 79/08; E05B 79/10

(Continued)

(56) References Cited

U.S. PATENT DOCUMENTS 11,725,426 B2 * 8/2023 Nagata .................... E05B 77/06 292/216
2011/0254287 A1 * 10/2011 Akizuki .................. E05B 77/06 292/223

(Continued)

FOREIGN PATENT DOCUMENTS

JP 2013-87454 A 5/2013
JP 2013087454 A * 5/2013

(Continued)

OTHER PUBLICATIONS

International Search Report issued in corresponding International Patent Applicaton No. PCT/JP2020/002696, dated Mar. 17, 2020, with English translation.

*Primary Examiner* — Kristina R Fulton
*Assistant Examiner* — James Edward Ignaczewski
(74) *Attorney, Agent, or Firm* — Rimon PC

(57) ABSTRACT

A door lock device includes: a latch; a ratchet; an outer lever; an open link; a first elastic member; an inertia lever; a second elastic member; a fitting hole provided to an acting piece protruding from the inertia lever; and a protrusion provided to the open link, wherein when an inertial force equal to or greater than a set value is exerted in a direction from an interior to an exterior, the inertia lever rotate against a biasing force of the second elastic member, the acting piece press the protrusion, the open link swing against a biasing force of the first elastic member by the protrusion being pressed by the acting piece, and the protrusion becomes fitted inside the fitting hole which achieves an inertia engagement configuration in which the inertia lever is kept at the blocking position and the open link is kept at the inertia engaging position.

10 Claims, 19 Drawing Sheets

(58) Field of Classification Search
USPC ........................................................ 292/336.3
See application file for complete search history.

(56) References Cited

U.S. PATENT DOCUMENTS

| | | | | |
|---|---|---|---|---|
| 2012/0110920 A1* | 5/2012 | Takagi | ..................... | E05B 85/26 292/226 |
| 2013/0015670 A1* | 1/2013 | Perkins | ..................... | E05B 77/12 29/428 |
| 2015/0240536 A1* | 8/2015 | Cumbo | ..................... | E05B 85/20 292/200 |
| 2017/0370128 A1* | 12/2017 | Akagi | ..................... | E05B 77/06 |
| 2018/0195315 A1* | 7/2018 | Mozola | ..................... | E05B 77/06 |
| 2018/0313118 A1* | 11/2018 | Hattori | ..................... | E05B 85/26 |
| 2019/0032373 A1* | 1/2019 | Taga | ..................... | E05B 85/02 |
| 2020/0190862 A1* | 6/2020 | Pettengill | ..................... | E05B 77/06 |
| 2021/0246692 A1* | 8/2021 | Fuchs | ..................... | E05B 77/06 |

FOREIGN PATENT DOCUMENTS

| | | | |
|---|---|---|---|
| JP | 2013-113043 A | | 6/2013 |
| JP | 2013113043 A | * | 6/2013 |
| JP | 2018-3305 A | | 1/2018 |

* cited by examiner

DOOR LOCK DEVICE

CROSS-REFERENCE TO RELATED APPLICATIONS

This application is the U.S. National Phase under 35 U.S.C. § 371 of International Application No. PCT/JP2020/002696, filed on Jan. 27, 2020, which claims the benefit of Japanese Application No. 2019-055057, filed on Mar. 22, 2019, the entire contents of each are hereby incorporated by reference.

FIELD

The present invention relates to a door lock device for a vehicle.

BACKGROUND

A door lock device provided inside a side door of a vehicle keeps the side door closed with an internal latch rotating and becoming engaged with a striker provided on the vehicle body. A ratchet fixes the latch at the angle for holding the striker. When an outer handle on the side door is operated, an outer lever provided inside is caused to operate in an interlocked fashion, to cause the ratchet to release the latch fixed thereby, and make the side door openable. The door lock device is required to keep the side door closed while the vehicle is running.

When the vehicle experiences a lateral collision (including minor ones), an inertial force is exerted on the side door in a direction from the interior to the exterior of the cabin. At this time, there is a concern that the latch engaged with the striker becomes released and makes the side door openable, due to the application of the inertial force, or due to the outer handle or the outer lever, which operates an interlocked fashion with the outer handle, being caused to operate by the deformation of the door.

To address this issue, a device disclosed in Patent Literature 1 includes an inertial member that is rotated by inertia. According to the disclosure, the inertial member is configured to rotate in a given direction when a collision occurs, and to operate to block the operation of a predetermined lever so that the latch is kept engaged with the striker. Another possible configuration includes, in addition to the configuration in which the operation of a predetermined lever is blocked, what is called a "swing-and-miss" configuration in which the lever is evacuated so as not to hit the counterpart member with which the lever is intended to become linked.

Furthermore, a device disclosed in Patent Literature 2 includes a latch mechanism having an operation receiving unit for releasing the engagement of the striker; an open link 48 that is rotated by an operation of the outer handle in an interlocked fashion; an inertial member that is swingable between an unlocking position and a locking position, the unlocking position being a position where the rotational force of the open link 48 can be communicated to the operation receiving unit, and the locking position being a position where the communication of the rotational force is prohibited; and a spring member that biases the inertial member in a direction from the locking position toward the unlocking position while keeping the inertial member movable. When an inertial force equal to or greater than a set value is exerted on the inertial member and displaces the inertial member in a direction toward the locking position against the biasing force of the spring member, the spring member becomes hooked onto a restricting unit, so that the biasing force of the spring member toward the unlock position is prevented from being exerted on the inertial member, and the door is prevented from being opened unintendedly.

CITATION LIST

Patent Literature

Patent Literature 1: Japanese Patent No. 5948786

Patent Literature 2: Japanese Patent Application Laid-open No. 2018-3305

SUMMARY

Technical Problem

There are sometimes cases where an airbag becomes inflated shortly after the collision, and causes another inertial force in a reverse direction, that is, in the direction from the exterior toward the interior of the cabin. With the device disclosed in Patent Literature 1, there is a concern that, when the inertial force in the reverse direction is generated, the inertial member is rotated in the reverse direction, and makes the door openable. This is a common issue in the blocking type structure and the "swing-and-miss" structure.

A possible solution for keeping the door locked against the inertial force in both of these two directions is to cause the inertial member to become engaged, after the inertial member is rotated when a collision occurs, with the counterpart member where the inertial force is exerted, in a manner maintaining their relative positions.

At the same time, there is a demand for unlocking the door, subsequent to a minor collision, by a releasing operation of the outer handle for making the door openable in the same way as it has been previously to the minor collision. In order to keep the door locked even by being subjected to inertial forces in both of these two directions, and to make the door openable after the collision, it is necessary to configure the inertial member to become engaged with the counterpart member in a manner maintaining their relative positions, and the engagement to be releasable.

The device disclosed in Patent Literature 2 includes the spring member that becomes hooked onto the restricting unit, thereby restricting the biasing force in a direction from the locking position to the unlocking position from being exerted on the inertial member. Therefore, there is a concern that, after the direction of the inertia exerted on the inertial member is reversed, the spring member becomes unhooked from the restricting unit, and the inertial member is moved to the unlocking position.

The present invention is made in consideration of the above, and an object of the present invention is to provide a door lock device capable of ensuring that the side door is not openable even when the door is subjected to inertial forces in both directions, and also making the door openable by subsequent operations.

Solution to Problem

To solve the problem and achieve the object, a door lock device according to the present invention includes: a latch that is pivotably supported by a latch shaft, and configured to engage with a striker for closing a door of a vehicle; a ratchet configured to keep the latch engaged with the striker; an outer lever that is pivotably supported by an outer lever shaft, and configured to link with an outer handle; an open link that is displaceable between an unlocking position, a locking position, and an inertia engaging position that is between the unlocking position and the locking position by swinging, the open link being configured to communicate a movement of the outer lever to the ratchet, thereby causing the ratchet to release an engagement of the latch, when the open link is at the unlocking position, and disable the movement of the outer lever, when the open link is at the locking position or the inertia engaging position; a first elastic member configured to bias the open link toward the unlocking position; an inertia lever that is displaceable between a standby position and a blocking position by rotating along a plane perpendicular to a plane where the open link swings, the inertia lever having a center of gravity decentered from a rotational axis thereof; a second elastic member configured to bias the inertia lever toward the standby position; a fitting hole that is provided to an acting piece protruding from the inertia lever; and a protrusion that is provided to the open link, and configured to project into a range of a trajectory of a movement of the fitting hole while the open link is at the unlocking position, wherein when an inertial force equal to or greater than a set value is exerted in a direction from an interior to an exterior of a cabin of the vehicle while the open link is at the unlocking position, the inertial force causes the inertia lever to rotate against a biasing force of the second elastic member, the acting piece is caused to press the protrusion, the open link is caused to swing against a biasing force of the first elastic member by the protrusion being pressed by the acting piece, and the protrusion becomes fitted inside the fitting hole which achieves an inertia engagement configuration in which the inertia lever is kept at the blocking position and the open link is kept at the inertia engaging position.

Moreover, in the door lock device according to the present invention, when an operation for opening the door is performed on the outer handle in the inertia engagement configuration, the open link is caused to swing further toward the locking position, the protrusion is caused to come out of the fitting hole, and the inertia lever returns to the standby position by the biasing force of the second elastic member.

Moreover, in the door lock device according to the present invention, the outer lever and the inertia lever are coaxial and independently rotatable, and the inertia lever includes a weight having a center of gravity decentered from the rotational axis.

Moreover, in the door lock device according to the present invention, the acting piece includes a first engaging surface provided around the fitting hole, the open link includes a second engaging surface that is provided on an opposite side of a pressed surface of the acting piece in the protrusion, and the inertia engagement configuration is achieved by causing the first engaging surface and the second engaging surface to press each other.

Moreover, the door lock device according to the present invention further includes: a lock lever configured to switch between an unlocking biased position where the open link is positioned at the unlocking position, and a locking biased position where the open link is positioned at the locking position; and an anti-panic lever configured to displace relatively to the lock lever, be displaceable between a cooperating position and an anti-panic position, and communicate a displacement of the lock lever to the open link, when the anti-panic lever is at the cooperating position, wherein when the outer lever is moved while the lock lever is at the locking biased position and the open link is at the locking position, the anti-panic lever moves relatively from the cooperating position to the anti-panic position, thereby permitting the lock lever to become displaced to the unlocking biased position, and returns from the anti-panic position to the cooperating position when the operation of the outer lever is ended, and when the inertial force causes the inertial lever to swing the open link, the open link and the anti-panic lever are caused to swing integrally, while the lock lever is kept at the unlocking biased position.

Moreover, in the door lock device according to the present invention, the anti-panic lever is biased toward the cooperating position by the first elastic member.

Advantageous Effects of Invention

In the door lock device according to the present invention, when an inertial force equal to or greater than a set value is exerted while the open link is at the unlocking position, the inertia causes the inertia lever to rotate against the biasing force of the second elastic member; the acting piece is caused to press the protrusion; the open link is caused to swing against the biasing force of the first elastic member by having the protrusion pressed by the acting piece 84; and the protrusion becomes fitted inside the fitting hole; and an inertia engagement configuration in which the inertia lever is kept at the blocking position and the open link is kept at the inertia engaging position is achieved thereby.

In this inertia engagement configuration, because the protrusion is inside the fitting hole, it is possible to keep the door unopenable even with the inertial forces exerted on the door in both directions. Furthermore, when the outer handle is operated subsequently, the open link is caused to move up and to swing to the locking position, to release the inertia engagement configuration and to return to the initial configuration (with the open link at the unlocking position and the inertia lever at the standby position) and to make the door openable.

DESCRIPTION OF EMBODIMENTS

A door lock device according to an embodiment of the present invention will now be explained in detail with reference to some drawings. The embodiment is, however, not intended to limit the scope of the present invention in any way.

Figure 1:
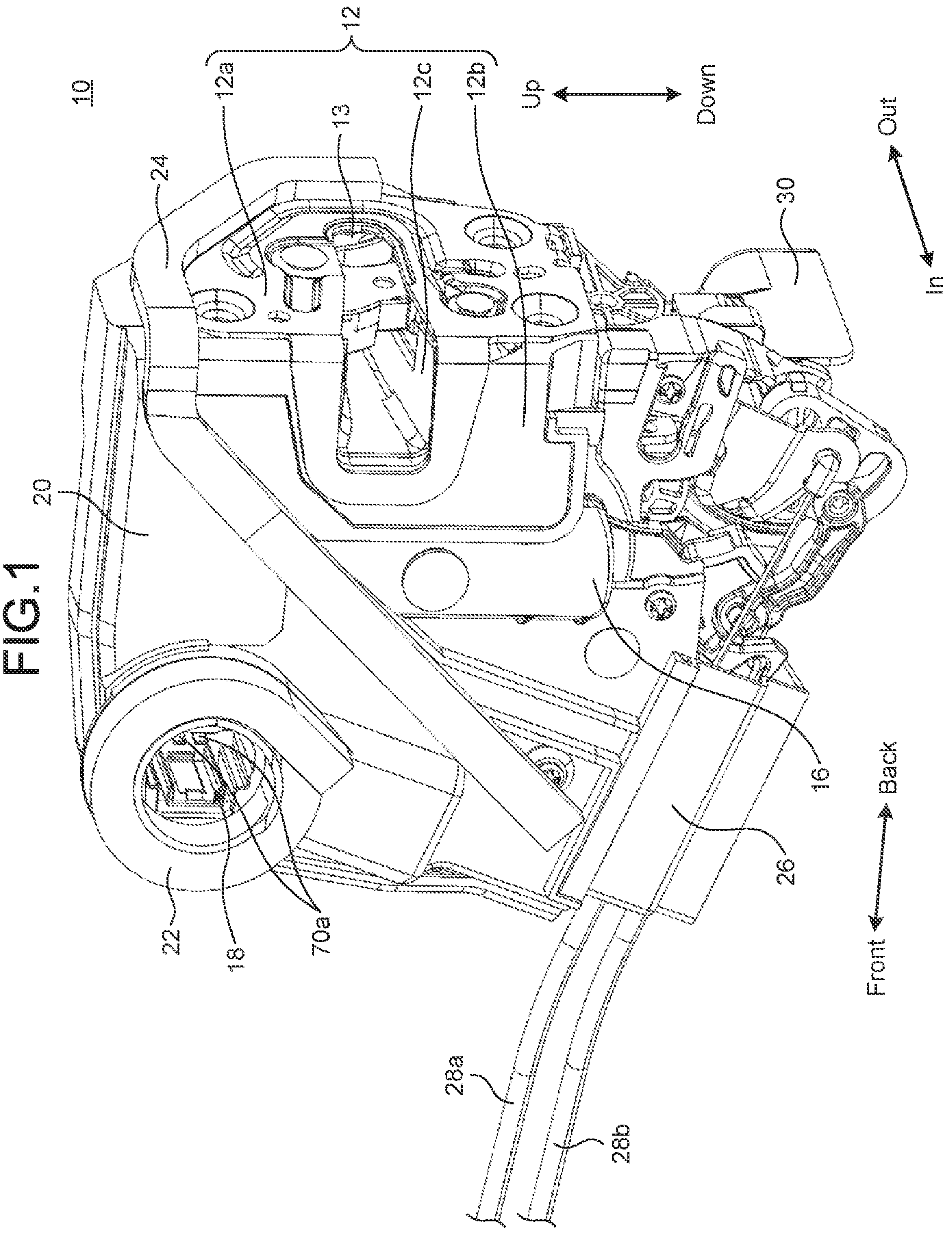
FIG. 1 is an external perspective view of a door lock device according to an embodiment, seen from a diagonally rear side.
Figure 2:
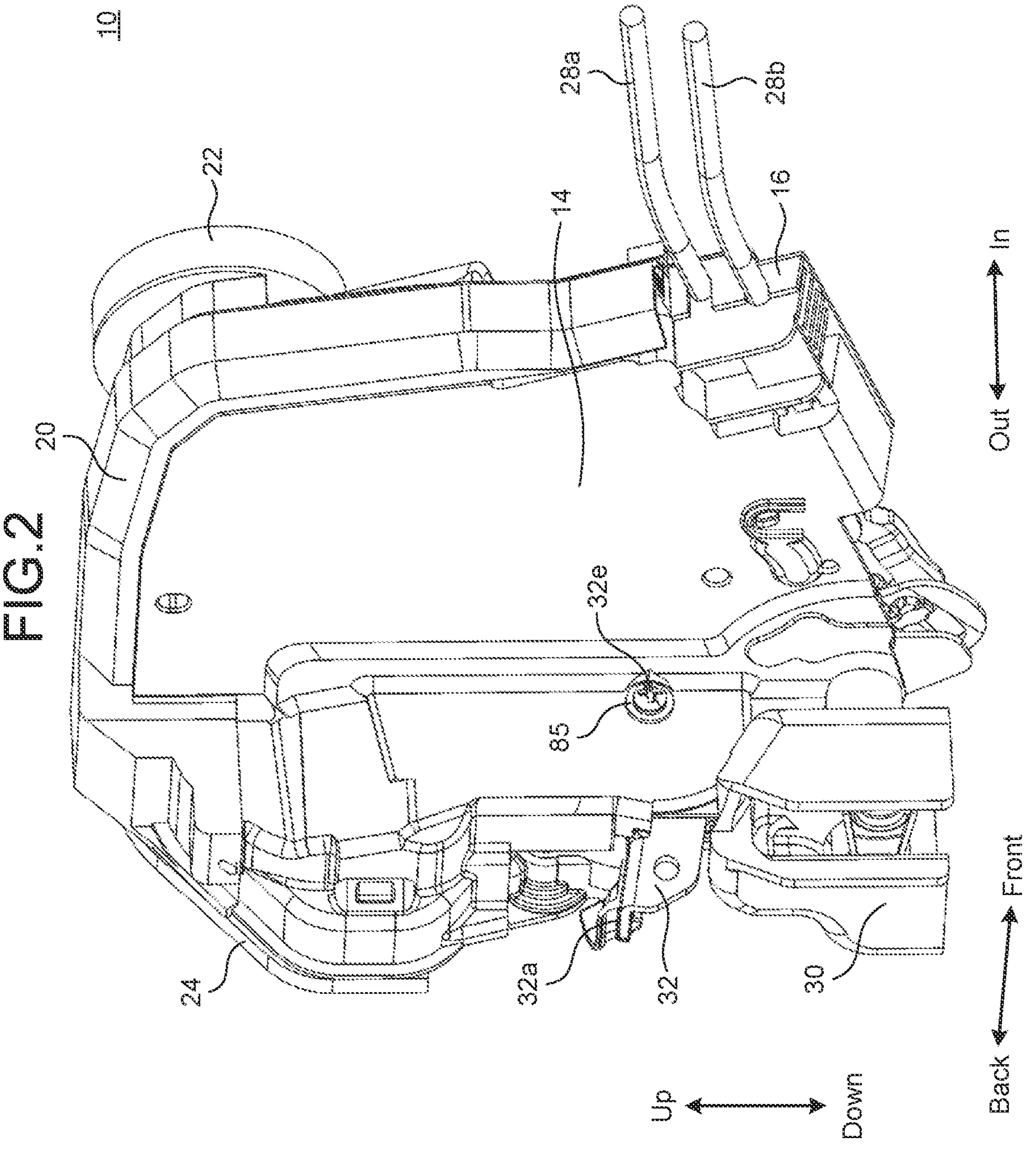
FIG. 2 is an external perspective view of the door lock device, seen from a diagonally rear and outer side of the vehicle.

FIG. 1 is an external perspective view of a door lock device 10 according to the embodiment, seen from a diagonally rear side. FIG. 2 is an external perspective view of the door lock device 10, seen from a diagonally rear and outer side of the vehicle. Hereinafter, directions in the door lock device 10 will be explained with reference to the vehicle. In the drawings, the directions are indicated by arrows pointing up and down, those pointing in and out (that is, toward interior and the exterior of the cabin), and those pointing front and back, with reference to the vehicle. Rotating directions (the clockwise direction and the counter-clockwise direction) of a rotating or swinging part are indicated with a viewpoint on the inner side when the rotations are about an axis in the in-and-out directions, and with a viewpoint on the rear side when the rotations are about an axis in the front-and-back directions.

The door lock device 10 is installed inside of a door of a vehicle (e.g., a side door on the front side). In the drawings, the door lock device 10 installed in the right door of the vehicle is illustrated as an example, but a structure bilaterally symmetric thereto may be used as a door lock device installed in a left door.

As illustrated in FIG. 1, the door lock device 10 includes a door latch device 12, casing 14 and a cover 16, a coupler 18 for achieving an electrical connection with an external device, a water-proof cover 20, water-proof seals 22 and 24, and a cable cover 26. The water-proof cover 20 covers the boundary between the casing 14 and the cover 16, on the top and the front sides of the door lock device 10. The water-proof seal 22 covers the circumference of the coupler 18. The water-proof seal 24 covers the top, the left, and the right sides of the door latch device 12, and a part of the inner side thereof up to where the cable cover 26 is provided.

The door latch device 12 is a device becoming engaged with or released from a striker provided on the vehicle body to open and to close the door of the vehicle. The door latch device 12 is fixed to a part of the casing 14 on the rear side of the vehicle, and supported at this position by the casing 14. The door latch device 12 includes a cover plate **12*a*, a body 12*b*, and a latch mechanism 13. The latch mechanism 13 is provided in the body 12*b*, and is covered by the cover plate 12*a*. The cover plate 12*a* has an entry groove 12*c*, and is attached to the body 12*b* so that the entry groove 12*c* is connected with the latch mechanism 13 in the in-and-out direction of the vehicle. The entry groove 12*c*** is a groove where the striker of the vehicle goes into when the vehicle door is closed.

Two cables **28*a*, 28*b* are connected to the interior surface of the door lock device 10. The cable 28*a* is connected to an inner handle not illustrated, and the cable 28*b*** is connected to a doorknob not illustrated. The inner handle is provided on the inner side of the door, and is for making an operation for opening the door. The doorknob is provided on the inner side of the door, and is for making an operation for locking and unlocking the door.

As illustrated in FIG. 2, a key cylinder operation unit 30 connected to a key cylinder, not illustrated, is provided to the outer surface of the door lock device 10. An end of an outer lever 32 linked to an outer handle, not illustrated, is exposed through the key cylinder operation unit 30. The key cylinder is provided on the outer side of the door, and is for making an operation for opening the door using the key. The outer handle is provided on the outer side of the door, and is for making an operation for opening the door. The outer handle is joined to a rod, not illustrated, that is, in turn, joined to a rod holder **32*a* of the outer lever 32**.

Figure 3:
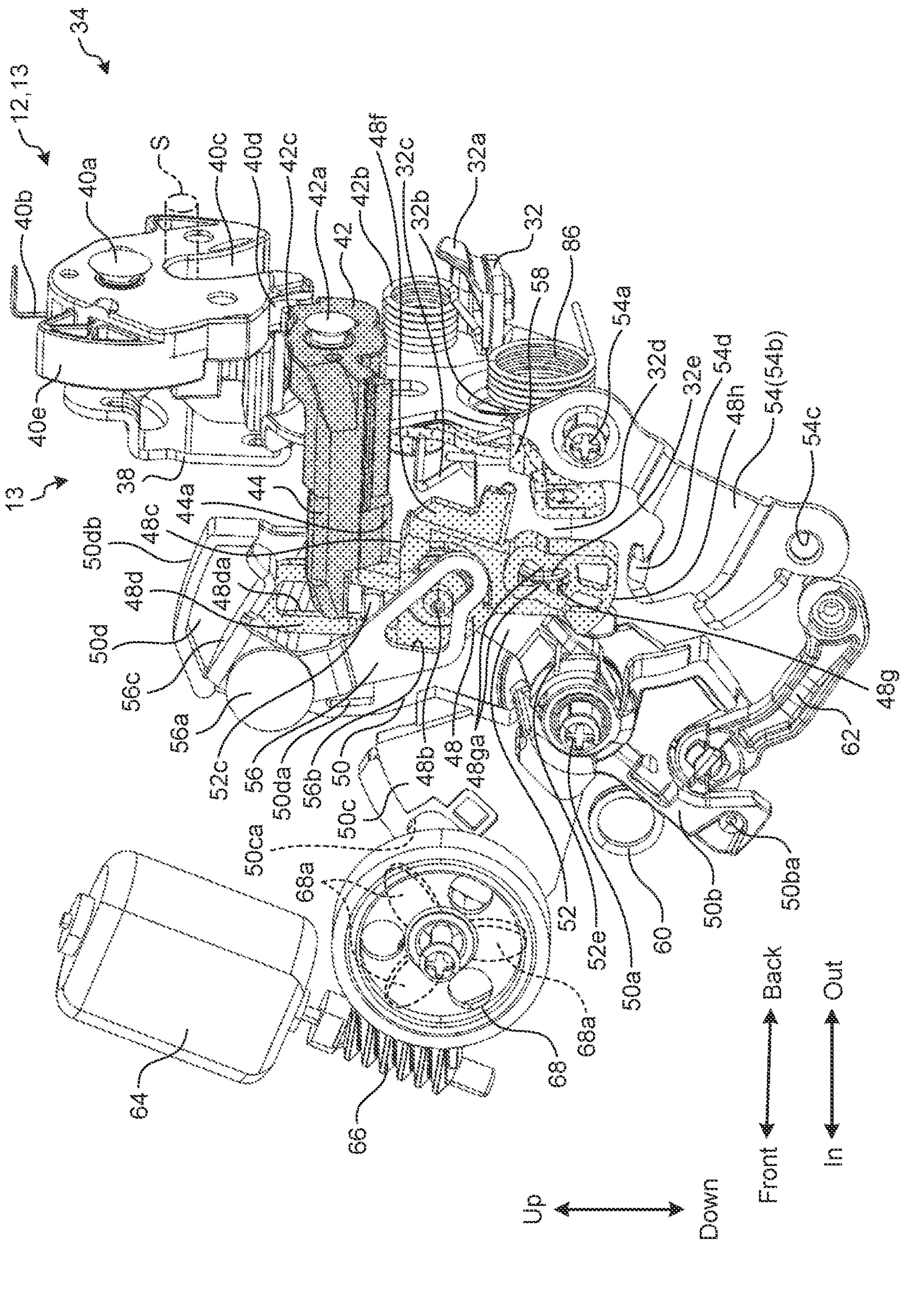
FIG. 3 is a perspective view illustrating a part of an internal mechanism of the door lock device.
Figure 4:
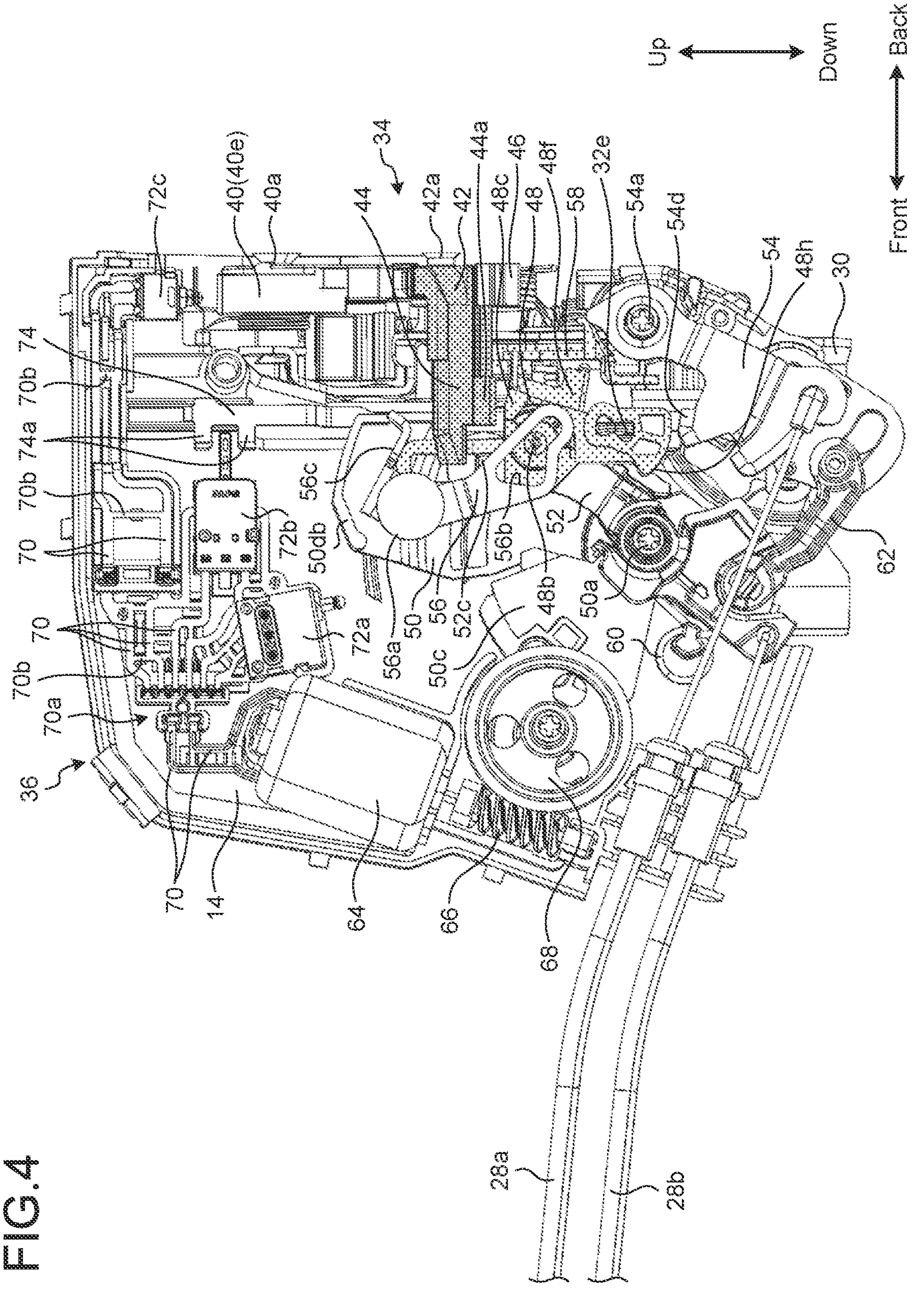
FIG. 4 is a side view of the door lock device with a cover removed.

FIG. 3 is a perspective view illustrating a part of an internal mechanism of the door lock device 10. FIG. 4 is a side view of the door lock device 10 with the cover 16 removed. As illustrated in FIG. 4, a mechanical structure unit 34 is disposed generally on the lower right, and an electrical machinery structure unit 36 is disposed generally on the upper left, inside the door lock device 10. To begin with, the mechanical structure unit 34 will be explained.

As illustrated in FIG. 3, a base plate 38 provides the base of the mechanical structure unit 34. The mechanical structure unit 34 includes the door latch device 12 and the latch mechanism 13. The latch mechanism 13 includes a latch 40 and a ratchet 42. The ratchet 42 is integrated with a release lever 44. The latch 40 is pivotably supported by a shaft (latch shaft) 40*a* extending in the front-and-back direction, is biased by a spring 40*b* in the clockwise direction, and closes the door by allowing a striker S to become engaged with a groove 40*c*. The latch 40 also includes an engaging unit 40*d* that becomes engaged with the ratchet 42, and a cam 40*e* provided to the outer circumference thereof.

The ratchet 42 is pivotably supported by a shaft 42*a* extending in the front-and-back direction, and is biased by a spring 42*b* in the counter-clockwise direction, when seen from the rear side. Claws 42*c* provided on the outer circumference of the ratchet 42 restrict the rotation of the latch 40 in the clockwise direction, when seen from the rear side, by becoming engaged with the engaging unit 40*d*, to keep the latch 40 engaged with the striker S. The ratchet 42 includes the release lever 44. The release lever 44 extends frontwards, and has a pressed portion 44*a*. The ratchet 42 is positioned, in the counter-clockwise direction, when seen from the rear side, by the abutment against rubber 46 (see FIG. 4).

The mechanical structure unit 34 also includes an open link 48, a lock lever 50, an anti-panic lever 52, an inner lever 54, a self-cancelling lever 56, and an inertia lever 58. The mechanical structure unit 34 also includes the outer lever 32, which has been mentioned above. In FIGS. 3 and 4, to facilitate identifications of these parts, the inertia lever 58 is indicated with a light dot pattern; the ratchet 42 including the release lever 44 is indicated with a dark dot pattern; and the open link 48 is indicated with a dot pattern the darkness of which is in between these dot patterns.

Figure 5:
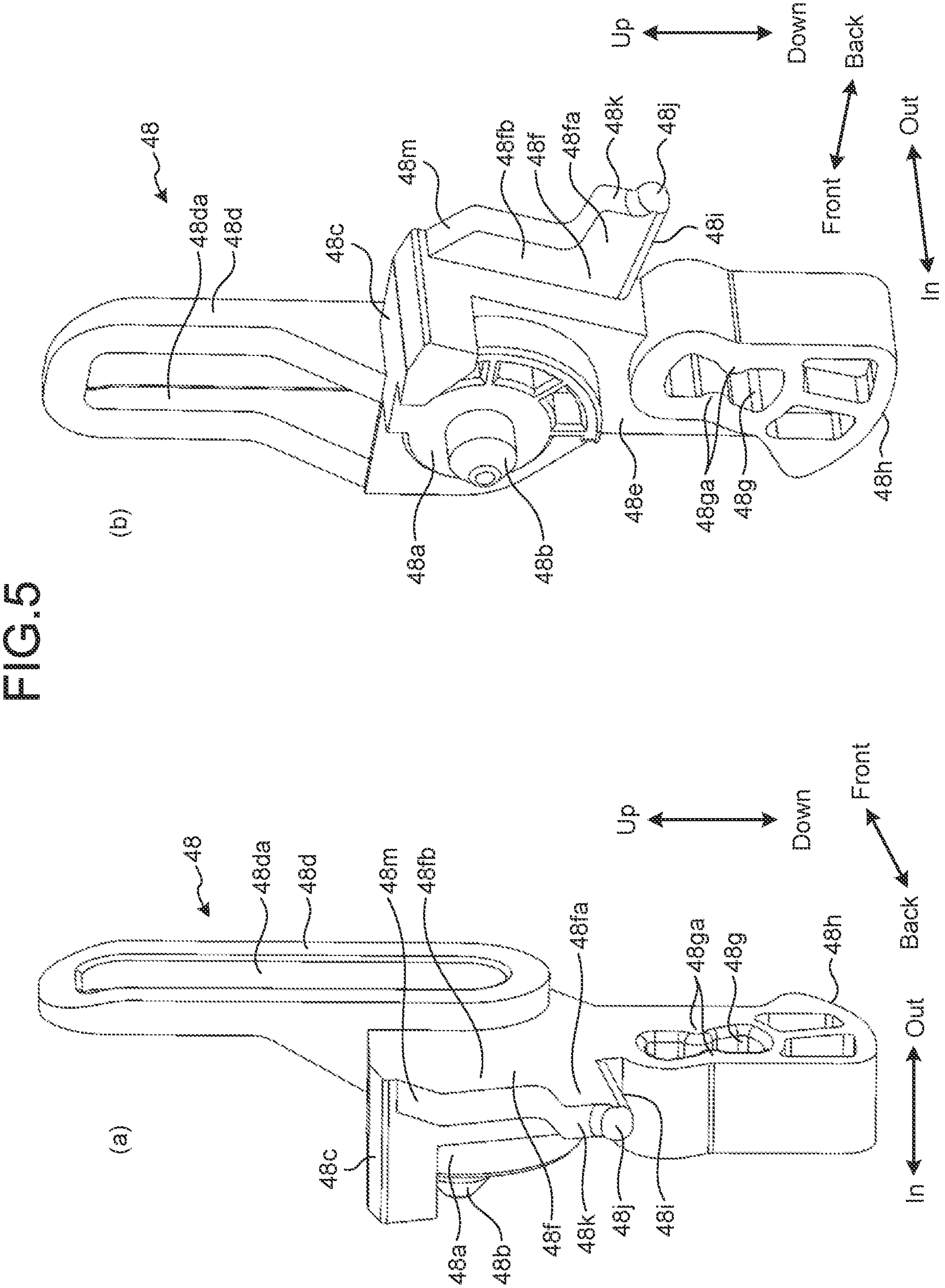
FIG. 5 is a perspective view of the open link, where (a) is a perspective view seen from the diagonally rear and outer side, and (b) is a perspective view seen from diagonally rear and inner side.

FIG. 5 is a perspective view of the open link 48, where (a) is a perspective view seen from a diagonally rear and outer side, and (b) is a perspective view seen from a diagonally rear and inner side.

As illustrated in FIG. 5, the open link 48 includes a circular seat 48*a* provided at the center, a central protrusion 48*b* protruding inwards from the circular seat 48*a*, a pressing table 48*c* provided on a rear upper side of the circular seat 48*a*, an upper lever 48*d* extending upwards, a lower lever 48*e* extending downwards, and a protruding piece 48*f* provided on the rear side.

The pressing table 48*c* is a part for pressing the pressed portion 44*a* (see FIG. 3). The upper lever 48*d* has a guide hole 48*da* elongated in the up-and-down direction. A coupling hole 48*g* penetrating in the width direction of the vehicle is provided approximately at the center of the lower lever 48*e*, and an arc-shaped bottom-end pressed portion 48*h* is provided below the coupling hole 48*g*.

The coupling hole 48*g* has a shape of two fans horizontally symmetrically connected to each other, and pressing pieces 48*ga* protruding from respective sides of the coupling hole 48*g* are provided at the center of the height of the coupling hole 48*g*. The open link 48 is configured to swing about the center of the coupling hole 48*g*, on a plane stretching in two directions of the front-and-back direction and the up-and-down direction. The coupling hole 48*g* is a part that is driven up and down by the outer lever 32. The bottom-end pressed portion 48*h* is a part that is pushed up by the inner lever 54, and has an arc-shaped surface with its center at the center of the coupling hole 48*g*.

The protruding piece 48*f* has a substantial L shape, when seen from a side, and has a bottom part 48*fa* protruding rearwards, and a base part 48*fb* extending substantially in the up-and-down direction. The bottom part 48*fa* forms a substantially right angle with the base part 48*fb*. A bottom end surface 48*i* of the bottom part 48*fa* has a semi-cylindrical shape, and is connected smoothly with a semispherical protrusion 48*j* provided on the rear end. A small engaging plane (second engaging surface) 48*k* is provided above and adjacently to the protrusion 48*j*. The engaging plane 48*k* is a plane intersecting substantially perpendicularly with the vehicle length direction (front-and-back direction) when the open link 48 is at an inertia engaging position (see FIG. 16).

The base part 48*fb* is provided behind the central protrusion 48*b*, and diagonally below the pressing table 48*c*. The top portion of the base part 48*fb* provides a slanted auxiliary abutment surface 48*m*.

Referring back to FIG. 3, the outer lever 32 is pivotably supported about a shaft (outer lever shaft) 32*b* extending in the front-and-back direction, is biased by a spring 32*c* in the counter-clockwise direction, and is kept at the position illustrated in FIG. 3 by a stopper not illustrated. The outer lever 32 includes an arm 32*d* extending on the opposite side of the rod holder 32*a*, and an inner coupling part 32*e* provided at the tip of the arm 32*d*. The inner coupling part 32*e* is inserted into the coupling hole 48*g* of the open link 48. When the rod holder 32*a* is driven downwards by an operation of the outer handle, the outer lever 32 is rotated in the clockwise direction, against the biasing force of the spring 32*c*. The inner coupling part 32*e* then pushes up the open link 48. When the open link 48 is at the unlocking position, the pressing table 48*c* is then brought into abutment against, and pushes up the pressed portion 44*a*. This causes the ratchet 42 to be rotated in the clockwise direction against the biasing force of the spring 42*b*, so that the engagement of the claw 42*c* and the engaging unit 40*d* is released, and the latch 40 is rotated in the clockwise direction by the biasing force of the spring 40*b*. As a result, the striker S becomes removable from the groove 40*c*.

The inner coupling part 32*e* has a slightly vertically elongated shape, and has both sides lightly supported by the pressing pieces 48*ga*. The open link 48 is swingable about the inner coupling part 32*e*, which is supported by the pressing pieces 48*ga*, as an axis, and can be displaced between the unlocking position, the locking position, and the inertia engaging position, with the actions of the lock lever 50. The inertia engaging position is a position between the unlocking position and the locking position.

The inner lever 54 is supported pivotably about a shaft 54*a* extending in the vehicle width direction (in-and-out direction), and includes an arm 54*b* extending downwards, a cable hole 54*c* provided to the lower part of the arm 54*b*, and a pressing table 54*d* provided approximately in the middle of the arm 54*b*. The cable 28*a* is connected to the cable hole 54*c*, and is driven by the inner handle. The pressing table 54*d* is formed by bending a part of the arm 54*b*, and is positioned below the bottom-end pressed portion 48*h* of the open link 48. When the inner handle is operated, the inner lever 54 becomes rotated in the clockwise direction, and the pressing table 54*d* is brought into abutment against, and pushes up the bottom-end pressed portion 48*h*. When the open link 48 is at the unlocking position, an operation for opening the door is performed, in the same manner as when the outer lever 32 is operated.

The lock lever 50 is pivotably supported about a shaft 50*a* extending in the in-and-out direction. The lock lever 50 swings by being driven by the doorknob, the key cylinder, and a control unit, and can be switched between an unlocking biased position for positioning the open link 48 at the unlocking position, and a locking biased position for positioning the open link 48 at the locking position. The lock lever 50 is biased selectively to either one of the unlocking biased position and the locking biased position, as a protrusion, not illustrated, provided thereto is carried over a part where the elasticity of a spring 60 is exerted. The lock lever 50 causes the open link 48 to be displaced between the unlocking position and the locking position via the anti-panic lever 52. The lock lever 50 illustrated in FIG. 3 is at the unlocking biased position.

The lock lever 50 has a downwardly extending portion 50*b*, a laterally extending portion 50*c*, and an upwardly extending portion 50*d*. The upwardly extending portion 50*d* includes a hole 50*da* having an arc shape with its center at the shaft 50*a* (see FIG. 6), and a cam portion 50*db* provided on the upper end. A cable hole 50*ba* is provided to the lower part of the downwardly extending portion 50*b*. The cable 28*b* is connected to the cable hole 50*ba*, and is driven by the doorknob. A part of the downwardly extending portion 50*b* is connected to the key cylinder operation unit 30 (see FIG. 2) via a link 62.

A motor 64 is provided substantially at the center of the height of the door lock device 10, and a worm gear 66 is provided on the rotational shaft of the motor 64. The worm gear 66 is meshed with a worm wheel 68. Three radial projections 68*a* are provided on the outer surface of the worm wheel 68, and these projections 68*a* can rotate the lock lever 50 via a silencer recess 50*ca* of the laterally extending portion 50*c*, as the worm wheel 68 is rotated.

Operations of the anti-panic lever 52 and an anti-panic mechanism 69 will now be explained. The anti-panic mechanism 69 is a mechanism including the open link 48, the lock lever 50, the anti-panic lever 52, and a spring 52*e*, and is a mechanism where the anti-panic lever 52, being biased in the clockwise direction by the spring 52*e*, is caused to swing relatively, while an outward protrusion 52*d* is guided along the arc-shaped hole 50*da*.

Figure 6:
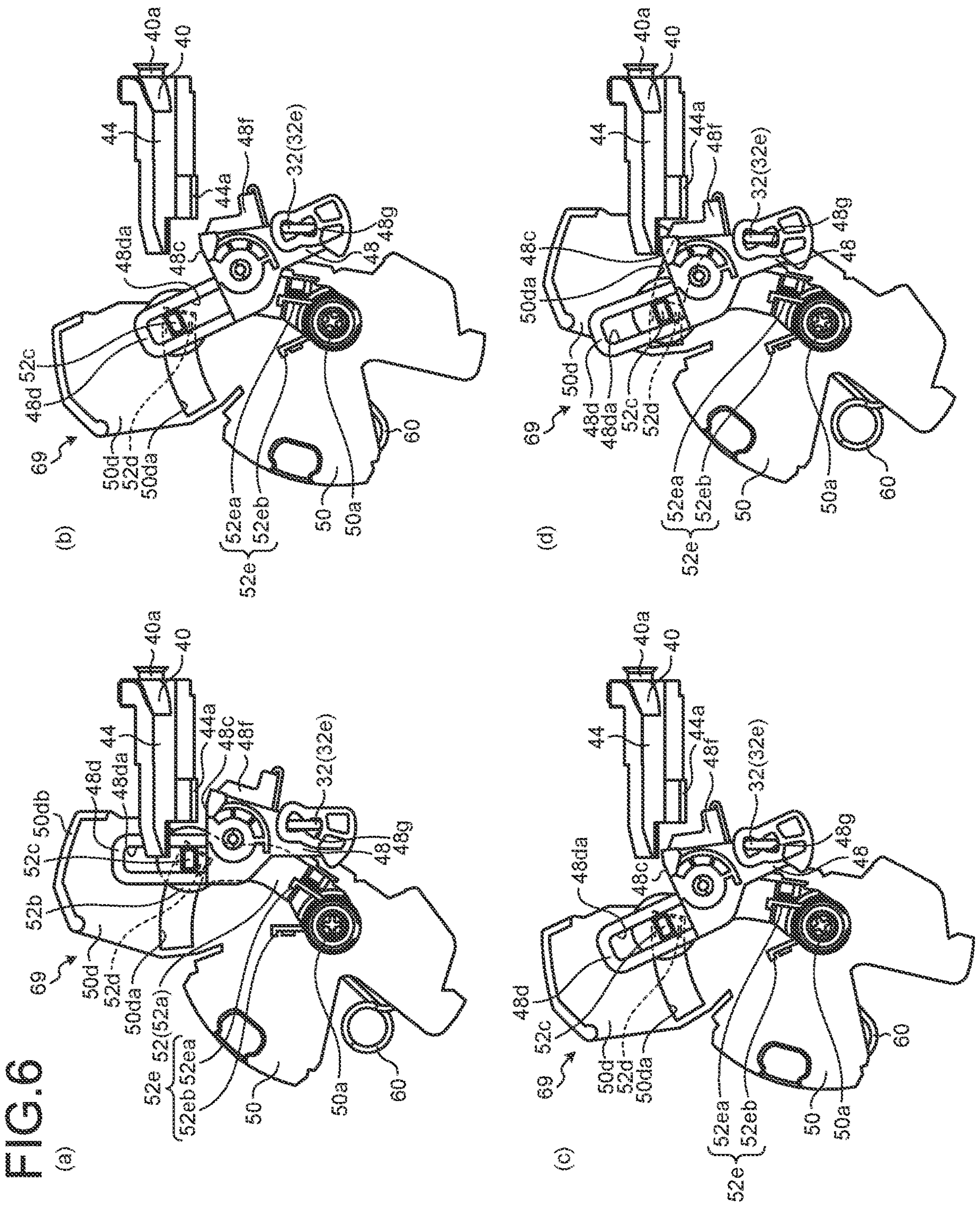
FIG. 6 is a schematic for explaining movements of an anti-panic mechanism, where (a) is a schematic illustrating an unlocked configuration, (b) is a schematic illustrating a locked configuration, (c) is a schematic illustrating a configuration resultant of operating an outer lever in the lock configuration, and (d) is a schematic illustrating a configuration resultant of performing an unlocking operation in the configuration illustrated in (c).

FIG. 6 is a schematic for explaining movements of the anti-panic mechanism 69, where (a) is a schematic illustrating an unlocked configuration, (b) is a schematic illustrating a locked configuration, (c) is a schematic illustrating a configuration resultant of operating the outer lever 32 in the locked configuration, and (d) is a schematic illustrating a configuration resultant of performing an unlocking operation in the configuration illustrated in (c).

As illustrated in FIG. 6(*a*), the bottom end of the anti-panic lever 52 is pivotably supported, together with the lock lever 50, by the shaft 50*a*. The anti-panic lever 52 includes an arm 52*a* extending substantially upwards, a disk 52*b* provided to the upper end, an inward protrusion 52*c* protruding inwards (frontwards with respect to the paper surface) from the disk 52*b*, and an outward protrusion 52*d* protruding outwards (rearwards with respect to the paper surface) from the disk 52*b*. The inward protrusion 52*c* is inserted into the guide hole 48*da* of the open link 48, in the short-width direction of the guide hole 48*da*. The outward protrusion 52*d* is inserted into the arc-shaped hole 50*da* of the lock lever 50, in the radial direction of the arc-shaped hole 50*da*. The disk 52*b* is held between the upper lever 48*d* of the open link 48 and the upwardly extending portion 50*d* of the lock lever 50.

The anti-panic lever 52 is elastically biased by the spring (first elastic member) 52*e* in the clockwise direction, with respect to the lock lever 50. In other words, one end 52*ea* of the spring 52*e* is hooked onto the anti-panic lever 52, and the other end 52*eb* is hooked onto the lock lever 50. In the ordinary unlocked configuration, that is, in the configuration illustrated in FIG. 6(*a*), the anti-panic lever 52 is positioned in the clockwise direction, by the outward protrusion 52*d* abutting against an end of the arc-shaped hole 50*da*. The lock lever 50 is kept at the unlocking biased position by the elastic force of the spring 60.

The anti-panic lever 52 is displaceable relatively between a cooperating position and an anti-panic position. The cooperating position is a position for causing the open link 48 to cooperate with the lock lever 50, and is a position where the anti-panic lever 52 is in the clockwise direction with respect to the lock lever 50, and where the outward protrusion 52*d* abuts against the end of the arc-shaped hole 50*da* in the clockwise direction, as illustrated in FIG. 6(*a*), or where the anti-panic lever 52 is restricted by another stopper.

The anti-panic position is a position for causing the lock lever 50 to move independently from the anti-panic lever 52, and is a position where the anti-panic lever 52 is in the counter-clockwise direction with respect to the lock lever 50, and the outward protrusion 52*d* abuts against the end of the arc-shaped hole 50*da* in the counter-clockwise direction, as illustrated in FIG. 6(*d*).

As illustrated in FIG. 6(*b*), when the lock lever 50 swings in the counter-clockwise direction and arrives at the locking biased position, and kept at the position by the spring 60. At this time, because the outward protrusion 52*d* is in abutment against the end of the arc-shaped hole 50*da* in the clockwise direction, the anti-panic lever 52 swings integrally with the lock lever 50. When the open link 48 comes to the locking position, the pressing table 48*c* becomes offset from the position immediately below the pressed portion 44*a* of the release lever 44.

When the outer lever 32 is moved, thereby causing the inner coupling part 32*e* to move upwards, as illustrated in FIG. 6(*c*), the open link 48 is moved up accordingly, but because the pressing table 48*c* is positioned offset from the pressed portion 44*a*, the pressing table 48*c* moves without pushing up the pressed portion 44*a*.

As illustrated in FIG. 6(*d*), when the unlocking operation is then performed from the configuration illustrated in FIG. 6(*c*), the lock lever 50 becomes displaced toward the unlocking biased position. When a releasing operation of the outer handle is executed, thereby causing the outer lever 32 to return to the initial position, the lock lever 50 is also returned to the unlocking position. In other words, the lock lever 50 is returned to the position illustrated in FIG. 6(*a*). To put it in other words, the lock lever 50 is returned to the unlocking biased position, against the biasing force of the spring 52*e*, but the anti-panic lever 52 and the open link 48 are kept standby at the positions illustrated in FIG. 6(*c*). At this time, the outward protrusion 52*d* becomes displaced by being guided inside the arc-shaped hole 50*da*.

Once the operation of the outer lever 32 is stopped from the configuration illustrated in FIG. 6(*d*), the inner coupling part 32*e* and the open link 48 are moved down, and the anti-panic lever 52 is caused to swing in the clockwise direction by the elastic force of the spring 52*e*, and is returned to the unlocked configuration illustrated in FIG. 6(*a*).

Referring back to FIG. 4, the self-cancelling lever 56 is pivotably supported by a shaft 56*a*, and has a guide hole 56*b* provided to an arm extending downwards, and a tab 56*c* provided near and above the shaft 56*a*. The shaft 56*a* is held by the cover 16. The guide hole 56*b* has an irregular shape including a substantially triangular portion one side of which is extended in one direction, and guides the central protrusion 48*b* of the open link 48. The tab 56*c* restricts the rotation of the self-cancelling lever 56 in the counter-clockwise direction to a given angle, by abutting against the projection provided on an inner surface of the cover 16.

When the door is closed with the door locked, the self-cancelling lever 56 moves the open link 48 forcibly from the locked position to the unlocked position, by pushing the central protrusion 48*b* through the action of the ratchet 42, with the assistance of the tab 56*c* and the guide hole 56*b*. This is a self-cancelling function, and is capable of forcibly changing the locked configuration to the unlocked configuration, when the locked door is closed manually with the portable device (key) left inside the vehicle to prevent the door from being locked with the key inside the vehicle. Furthermore, the guide hole 56*b* has an irregular shape so that the self-cancelling lever is not caused to move when the open link 48 is operated by an ordinary locking/unlocking operation and a releasing operation.

The electrical machinery structure unit 36 includes a plurality of terminals 70 that are conductive bodies, and limit switches 72*a*, 72*b*, 72*c*, as well as the motor 64 described above. The terminals 70 have their one ends connected to the limit switches 72*a* to 72*c* or to the motor 64, and the other ends are bundled at one location, and forms a pin 70*a* bending and protruding inwards. The pin 70*a* is an electrical connector unit of the coupler 18 (see FIG. 1). The terminals 70 are joined at a coupling part 70*b*, and are cut after being positioned inside the casing 14.

The limit switch 72*a* is caused to operate by the cam portion 50*db*, and detects whether the lock lever 50 is at the unlocking biased position or the locking biased position. The limit switch 72*b* is caused to operate by the pair of claws 74*a* of a rod 74 extending in the up-and-down directions. The rod 74 is interlocked with the key cylinder operation unit 30, and the limit switch 72*b* detects the status of the key cylinder operation unit 30. The limit switch 72*c* is caused to operate by the cam 40*e*, and detects the status of the latch 40. The control unit detects various types of status of the door lock device 10 based on the detection signals from the limit switches 72*a* to 72*c*, and controls to rotate the motor 64, or to turn on the room lamp.

Figure 7:
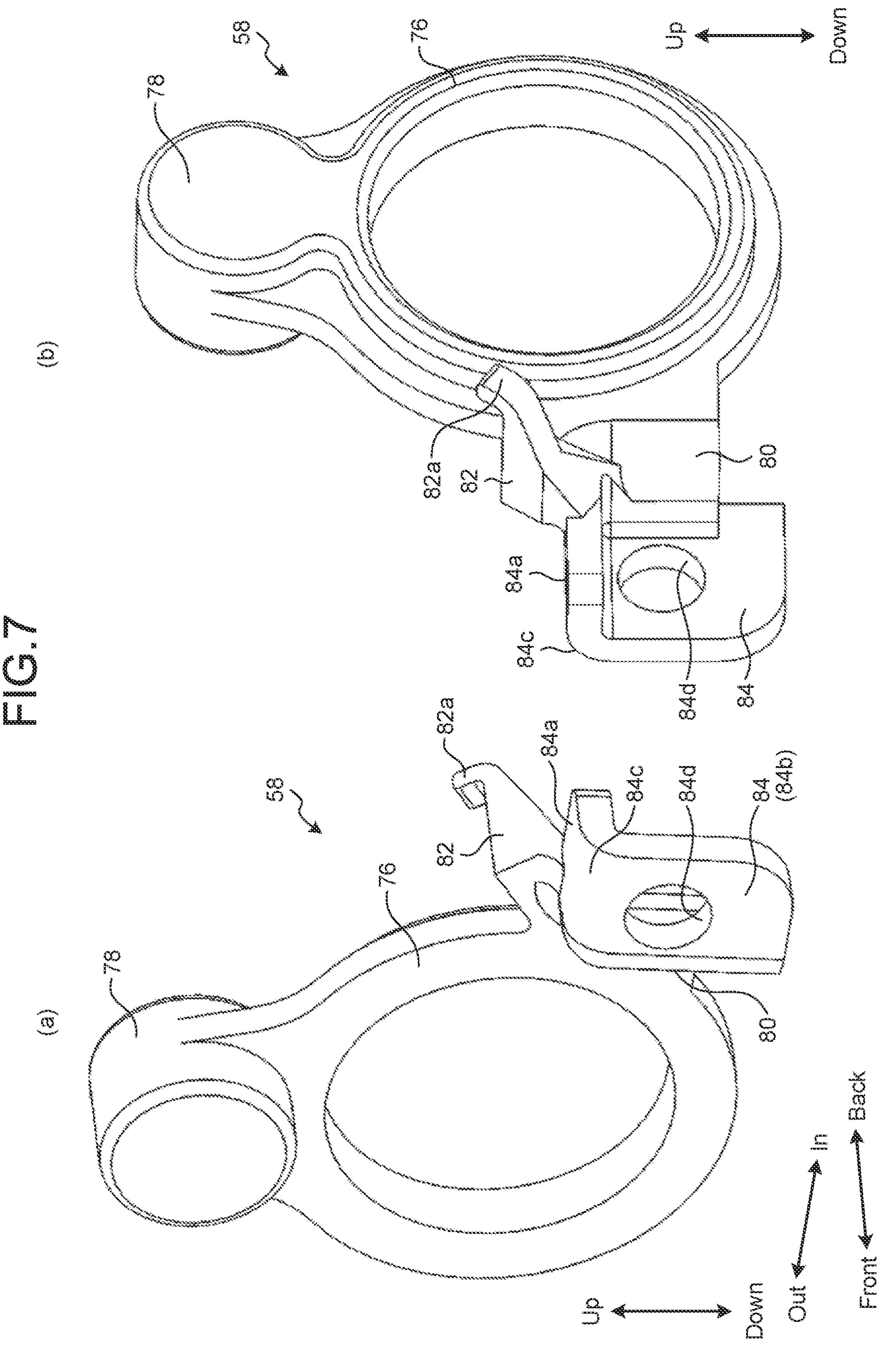
FIG. 7 is a schematic illustrating an inertia lever, where (a) is a perspective view seen from a diagonally front side, and (b) is a perspective view seen from a diagonally rear side.

The inertia lever 58 and its effects will now be explained. FIG. 7 is a schematic illustrating the inertia lever 58, where (a) is a perspective view seen from a diagonally front side, and (b) is a perspective view seen from a diagonally rear side.

As illustrated in FIG. 7, the inertia lever 58 has a ring 76 at the center, a weight 78 provided above the ring 76, and a short arm 80 protruding inwards from the ring 76. The weight 78 has a cylindrical shape the inside of which is hollow, the diameter of which is a half the diameter of the ring 76, and slightly protrudes forwards, for example. Because the inertia lever 58 has the weight 78, the center of gravity G (see FIG. 10) is slightly decentered toward above the rotational center (the center of the ring 76). The weight 78 is provided at an appropriate position based on the rotational axis and the direction in which an inertial force F1*o* to be described later is exerted.

The position of the center of gravity G may be adjusted based on the size, the material, and the position of the weight 78, depending on the type of the vehicle in which the door lock device 10 is used, for example. The arm 80 has a spring keeper 82 provided in the upper part, and an acting piece 84 protruding further inwards. One end of the spring keeper 82 is bent upwards, and provides a stopper 82*a*. The spring keeper 82 is a part for catching the one end of a spring 86 (second elastic member, see FIG. 3), to be described later. The other end of the spring 86 is hooked onto a given hook provided to the casing 14.

The acting piece 84 includes a pressing surface 84*a* facing upwards, an acting surface (first engaging surface) 84*b* facing frontwards, a curved surface 84*c* connecting the pressing surface 84*a* and the acting surface 84*b*, and a fitting hole 84*d* penetrating the acting surface 84*b* in the front-and-back direction. The fitting hole 84*d* is a part where the protrusion 48*j* of the open link 48 (see FIG. 8) is fitted, and is moderately larger than the protrusion 48*j*. When the open link 48 is at the unlocking position, the protrusion 48*j* projects into the range of the trajectory of the movement of the fitting hole 84*d*. Because the fitting hole 84*d* can serve its purpose sufficiently as long as the hole is deeper than the length of the protrusion 48*j*, examples of the fitting hole 84*d* according to the present disclosure include a pass-through hole and a hole with a bottom.

The bottom part 48*fa* itself does not fit into the fitting hole 84*d*.

Figure 8:
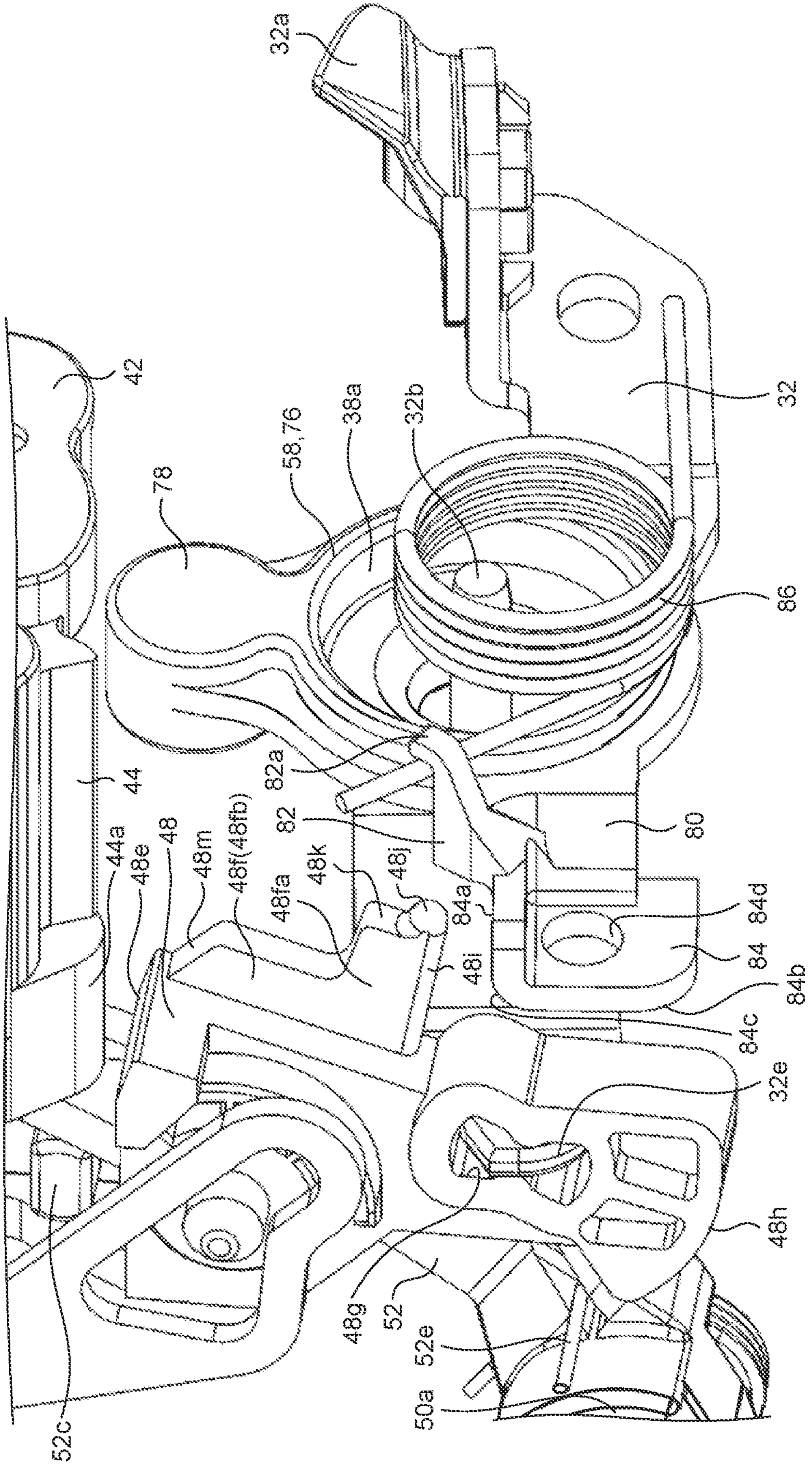
FIG. 8 is a perspective view illustrating the open link, the inertia lever, and parts nearby.

FIG. 8 is a perspective view illustrating the open link 48, the inertia lever 58, and parts nearby. As illustrated in FIG. 8, the ring 76 is rotatably supported, on the inner circumference thereof, by a coaxial cylinder 38*a* provided to the base plate 38, and is biased by the spring 86 in the counter-clockwise direction.

The inertia lever 58 is kept at a standby position that is the initial position by having its rotation in the counter-clockwise direction restricted. The rotation is restricted by the bottom surface of the arm 80 being brought into abutment against a part of the inner surface of the cover 16. The standby position is an orientation where the weight 78 is oriented upwards, and the arm 80 is oriented inwards. The inertia lever 58 can be rotated about a shaft 32*b* by inertia, as will be described later, and becomes displaced to a blocking position against the elastic force of the spring 86. In other words, the inertia lever 58 is displaceable between the standby position and the blocking position. The inertia lever 58 illustrated in FIGS. 8 and 7 is at the standby position. When the inertia lever 58 is at the standby position, the pressing surface 84*a* is positioned slightly below the protrusion 48*j*.

Figure 9:
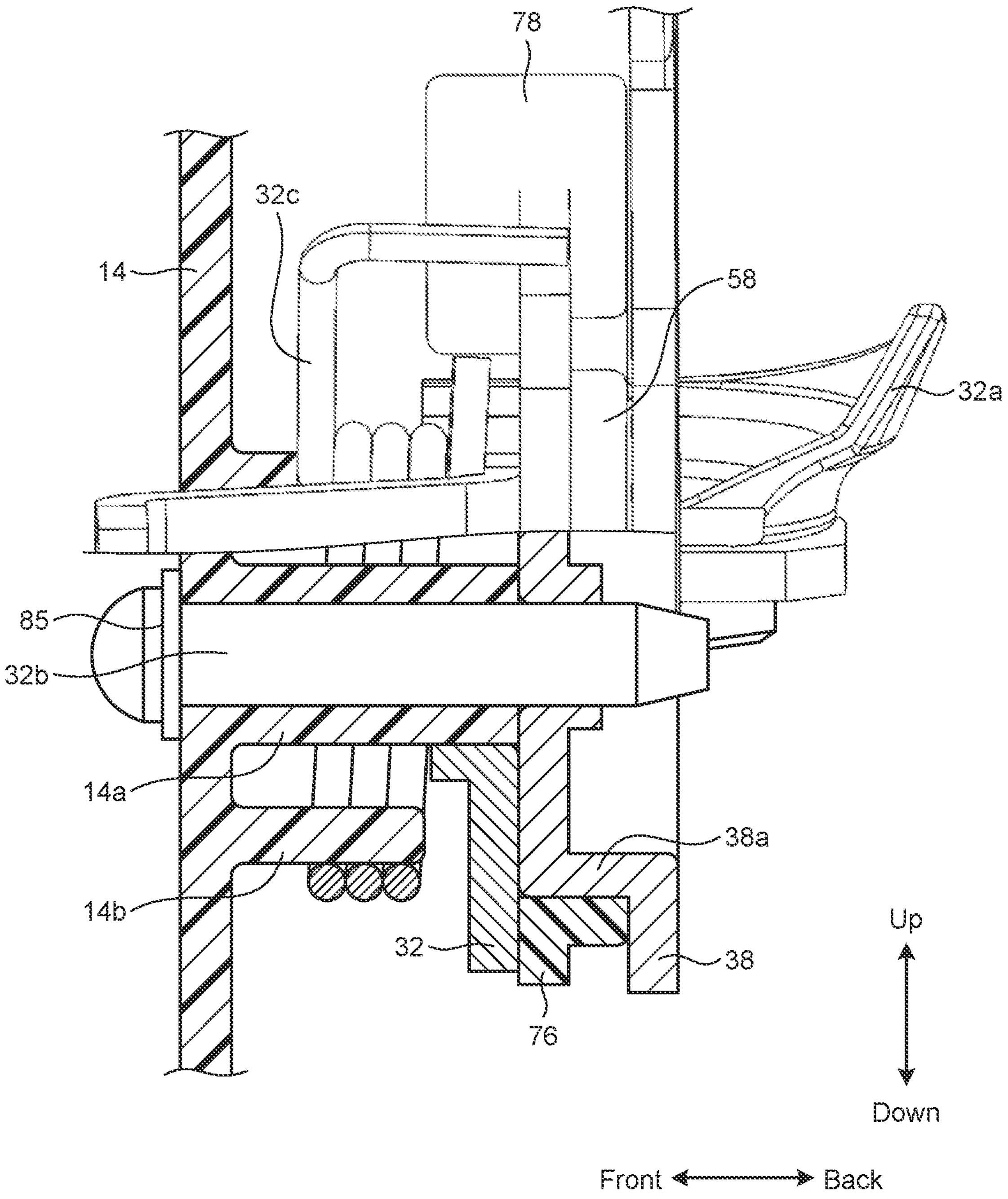
FIG. 9 is a partial sectional side view illustrating the outer lever, the inertia lever, a shaft that pivotably supports the outer lever and the inertia lever, and elements nearby.

FIG. 9 is a partial sectional side view illustrating the outer lever 32, the inertia lever 58, the shaft 32*b* that pivotably supports the outer lever 32 and the inertia lever 58, and elements nearby. As illustrated in FIG. 9, the shaft 32*b* is a bolt, and the tip thereof is screwed into a part of the base plate 38. The base end head of the shaft 32*b* protrudes outside of the casing 14, and fastened to the casing 14 with a washer 85 therebetween (see FIG. 2). In this manner, the shaft 32*b* has an effect for fastening the base plate 38 onto the casing 14. The ring 76 of the inertia lever 58 is pivotably supported by the coaxial cylinder 38*a* covering the shaft 32*b*. The coaxial cylinder 38*a* is a press-formed part of the base plate 38. The outer lever 32 is also pivotably supported by a coaxial cylinder 14*a* that is a rearward protrusion of a part of the casing 14. In the same manner, the spring 32*c* is supported by a coaxial cylinder 14*b* that is another rearward protrusion of the casing 14. The coaxial cylinders 38*a*, 14*a*, 14*b* are coaxial with the shaft 32*b*. Therefore, the outer lever 32 and the inertia lever 58 are substantially supported by the shaft 32*b* pivotably. The outer lever 32 and the inertia lever 58 are independently rotatable. Because the shaft 32*b* is the reference of the rotation of the inertia lever 58, the plane on which the inertia lever 58 rotates includes the two directions of the in-and-out direction and the up-and-down direction. Because the plane on which the open link 48 swings includes two directions of the front-and-back direction and the up-and-down direction, the plane on which the open link 48 swings is perpendicular to the plane on which the inertia lever 58 rotates.

Interactions between the inertia lever 58 and the open link 48 will now be explained.

Figure 10:
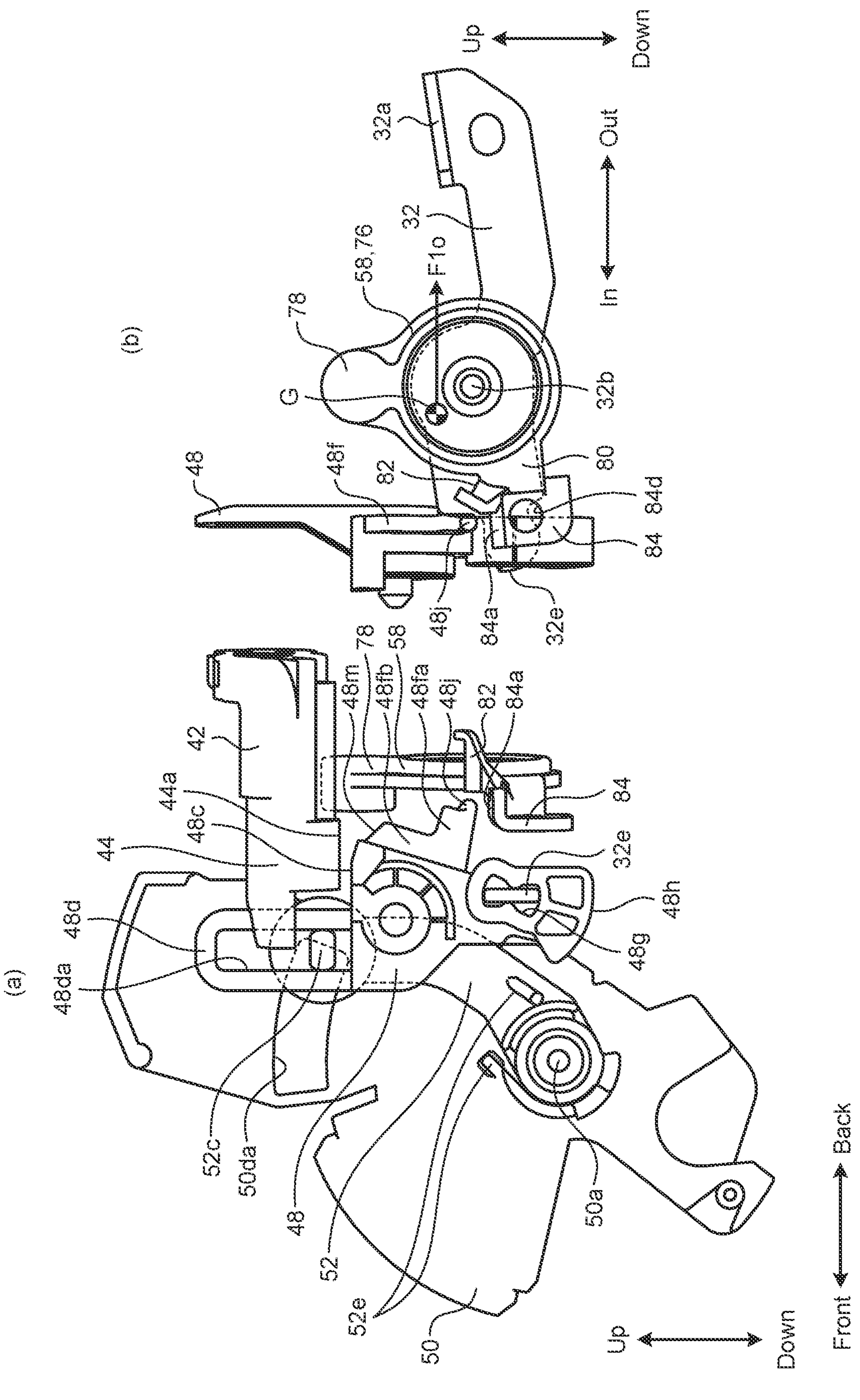
FIG. 10 is a schematic illustrating a positional relation of the inertia lever, the open link, a lock lever, and a ratchet in an initial configuration, where (a) is a side view, and (b) is a rear view.

FIG. 10 is a schematic illustrating a positional relation of the inertia lever 58, the open link 48, the lock lever 50, and the ratchet 42 in the initial configuration, where (a) is a side view, and (b) is a rear view. FIGS. 10 to 15 and FIGS. 17 to 19 illustrate the interactions between the inertia lever 58 and the open link 48, in the order of their movements, where (a) is a side view, and (b) is a rear view. In (a) and (b), the positions in the height direction are illustrated in a manner aligned with each other.

As illustrated in FIG. 10, in the initial configuration, it is assumed that the open link 48 is at the unlocking position, that is, at a position where the upper lever 48*d* is oriented upwards, and the bottom-end pressed portion 48*h* is oriented downwards. The inertia lever 58 is at the standby position, and the pressing table 48*c* is positioned below the protrusion 48*j*. The positions of the inertia lever 58 and the open link 48 in the initial configuration are the same as those in FIGS. 3, 6(*a*), and 8.

As illustrated in FIG. 10(*b*), the center of gravity G of the inertia lever 58 is slightly decentered from the shaft 32*b*, because of the presence of the weight 78 on the upper side and the arm 80 on the inner side. In other words, in FIG. 10(*b*), the center of gravity G is positioned on the slightly upper left side of the shaft 32*b*.

When the vehicle experiences a lateral collision, and the door receives a lateral impact, an outward inertial force F1*o* is exerted on the door lock device 10, as a counteraction to the lateral impact. The inertial force F1*o* affects the center of gravity G of the inertia lever 58. Because the center of gravity G is offset from the shaft 32*b* substantially upwards, a rotational moment, which is determined by the distance between the center of gravity G and the shaft 32*b* in the up-and-down direction and the magnitude of the inertial force F1*o*, is exerted on the inertia lever 58, and the inertia lever 58 receives a biasing force in the clockwise direction. When this rotational moment is greater than the elastic force of the spring 86 (see FIG. 8), the inertia lever 58 becomes rotated in the clockwise direction. In FIGS. 10 to 19, the spring 86 is omitted to avoid complexity.

Figure 11:
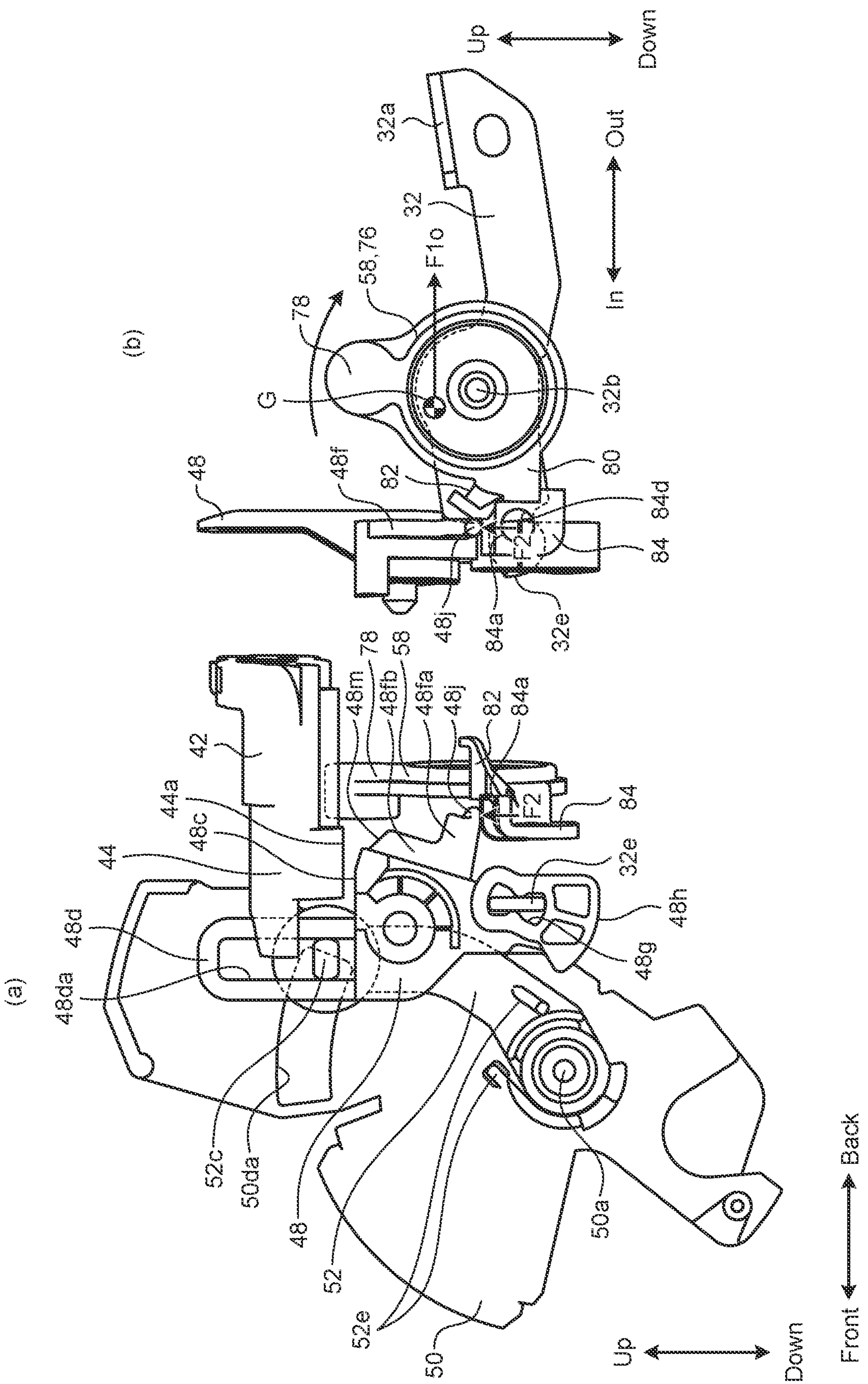
FIG. 11 is a schematic illustrating a positional relation of the inertia lever, the open link, the lock lever, and the ratchet after an inertial force has caused the inertia lever to move and brought the pressing surface into abutment against the protrusion, where (a) is a side view, and (b) is a rear view.

FIG. 11 is a schematic illustrating a positional relation of the inertia lever 58, the open link 48, the lock lever 50, and the ratchet 42 after the inertial force F1*o* has caused the inertia lever 58 to move and brought the pressing surface 84*a* into abutment against the protrusion 48*j*. As illustrated in FIG. 11, once the inertial force F1*o* causes the inertia lever 58 to rotate, the pressing surface 84*a* of the inertia lever 58 is brought into abutment against the bottom part 48*fa* of the protruding piece 48*f* of the open link 48. Because the bottom part 48*fa* is inclined rearwards and downwards, the pressing surface 84*a* is brought into abutment against the protrusion 48*j* that is the tip of the bottom part 48*fa*, and presses the protrusion 48*j* upwards at a force F2. The force F2 is a force determined by the inertial force F1*o*.

Although the open link 48 is biased by the spring 52*e* in the clockwise direction via the anti-panic lever 52, when the inertial force F1*o* is greater than a set value, the protruding piece 48*f* is moved upwards by the force F2 against the elastic force of the spring 52*e*, the weight of the open link 48 itself, and the weight of the anti-panic lever 52. As the protruding piece 48*f* is pushed upwards, the open link 48 is caused to swing in the counter-clockwise direction about the inner coupling part 32*e* of the outer lever 32, inserted in the coupling hole 48*g*.

Figure 12:
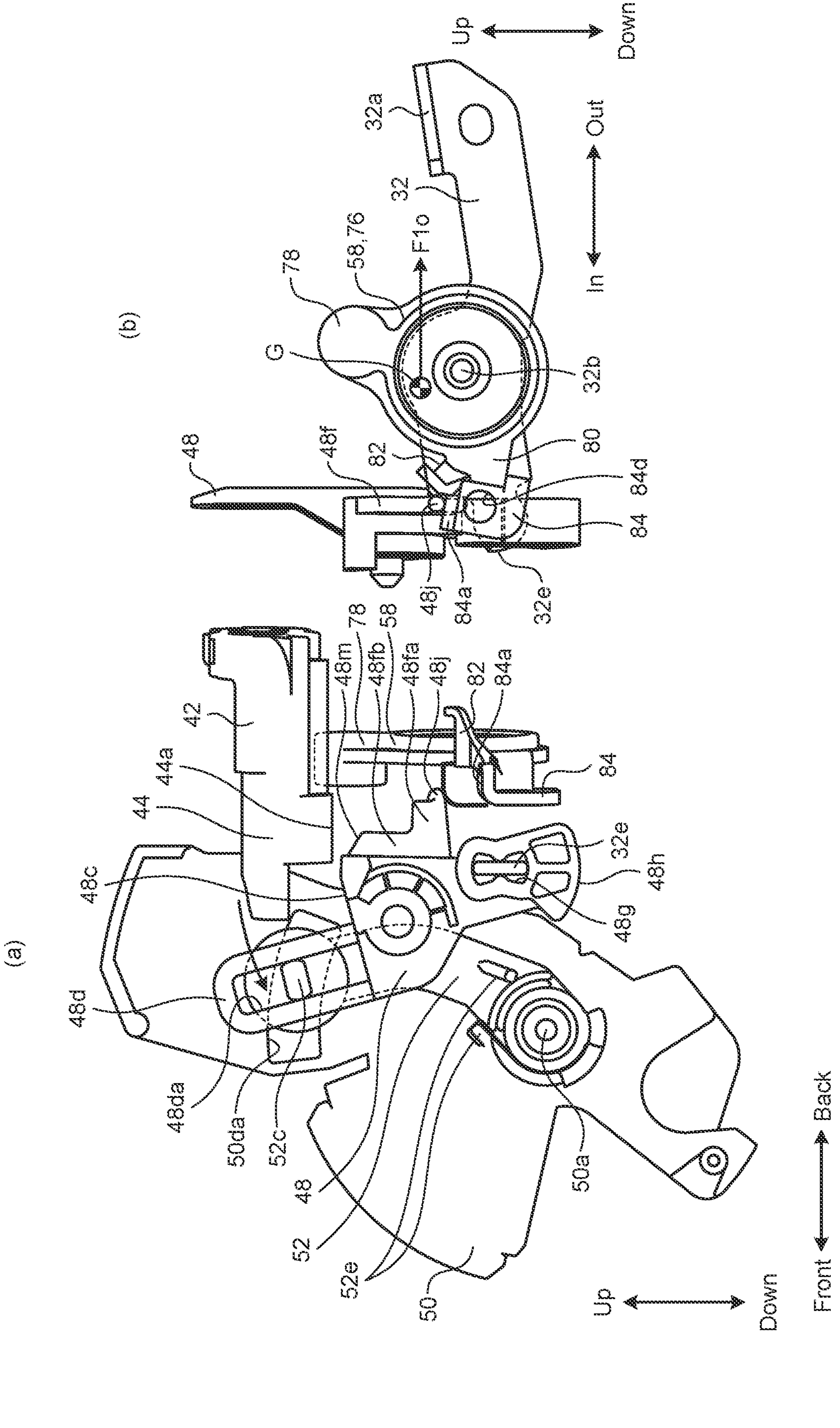
FIG. 12 is a schematic illustrating a positional relation of the inertia lever, the open link, the lock lever, and the ratchet after the pressing surface has pushed up the protrusion further, from the configuration illustrated in FIG. 11, where (a) is a side view, and (b) is a rear view.

FIG. 12 is a schematic illustrating a positional relation of the inertia lever 58, the open link 48, the lock lever 50, and the ratchet 42 after the pressing surface 84*a* has pushed up the protrusion 48*j* further, from the configuration illustrated in FIG. 11. As illustrated in FIG. 12, when the open link 48 swings, the protrusion 48*j* slides frontwards along the pressing surface 84*a*, and reaches the curved surface 84*c*. The protrusion 48*j* is then transferred from the pressing surface 84*a* to the curved surface 84*c*, and is kept pushed by the curved surface 84*c*. Because the protrusion 48*j* has a semi-spherical shape, the protrusion 48*j* slides easily along the pressing surface 84*a* and the curved surface 84*c*.

Figure 13:
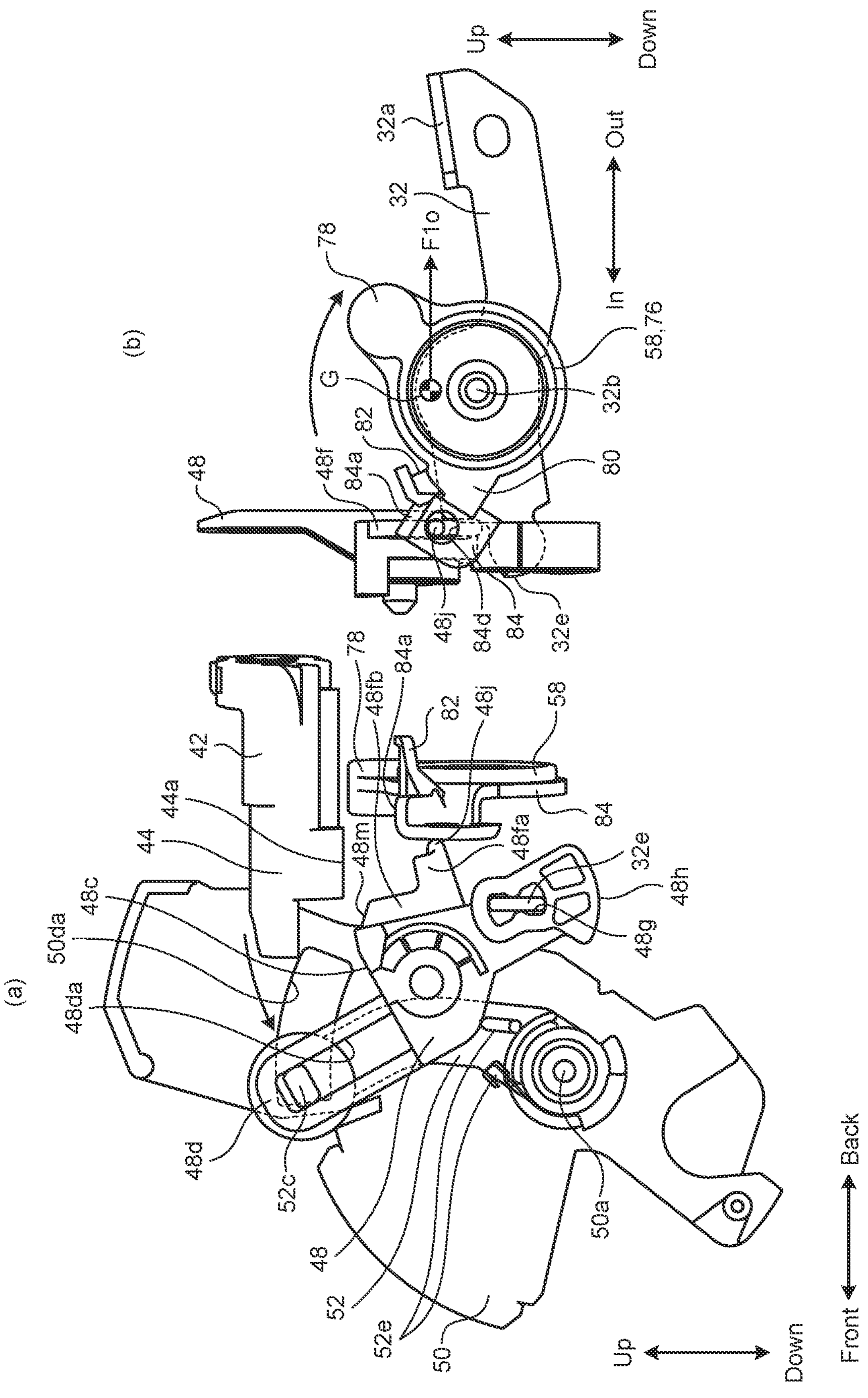
FIG. 13 is a schematic illustrating a positional relation of the inertia lever, the open link, the lock lever, and the ratchet after the protrusion is carried over the pressing surface, from the configuration illustrated in FIG. 12, and immediately before getting inside the fitting hole, where (a) is a side view, and (b) is a rear view.

FIG. 13 is a schematic illustrating a positional relation of the inertia lever 58, the open link 48, the lock lever 50, and the ratchet 42 after the protrusion 48*j* has been carried over the pressing surface 84*a*, from the configuration illustrated in FIG. 12, and immediately before getting inside the fitting hole 84*d*.

As illustrated in FIG. 13, when the open link 48 swings further, the protrusion 48*j* is carried over the pressing surface 84*a* and the curved surface 84*c*, comes to face the upper end of the fitting hole 84*d*, and the force F2 stops being exerted on the protrusion 48*j*. At this point in time, the open link 48 has reached the locking position or a position nearby. Because the open link 48 is receiving the force of the spring 52*e* in the clockwise direction via the anti-panic lever 52, once the force F2 stops being exerted on the protrusion 48*j*, the open link 48 as well as the anti-panic lever 52 stop swinging in the counter-clockwise direction, and start swinging in the clockwise direction.

Figure 14:
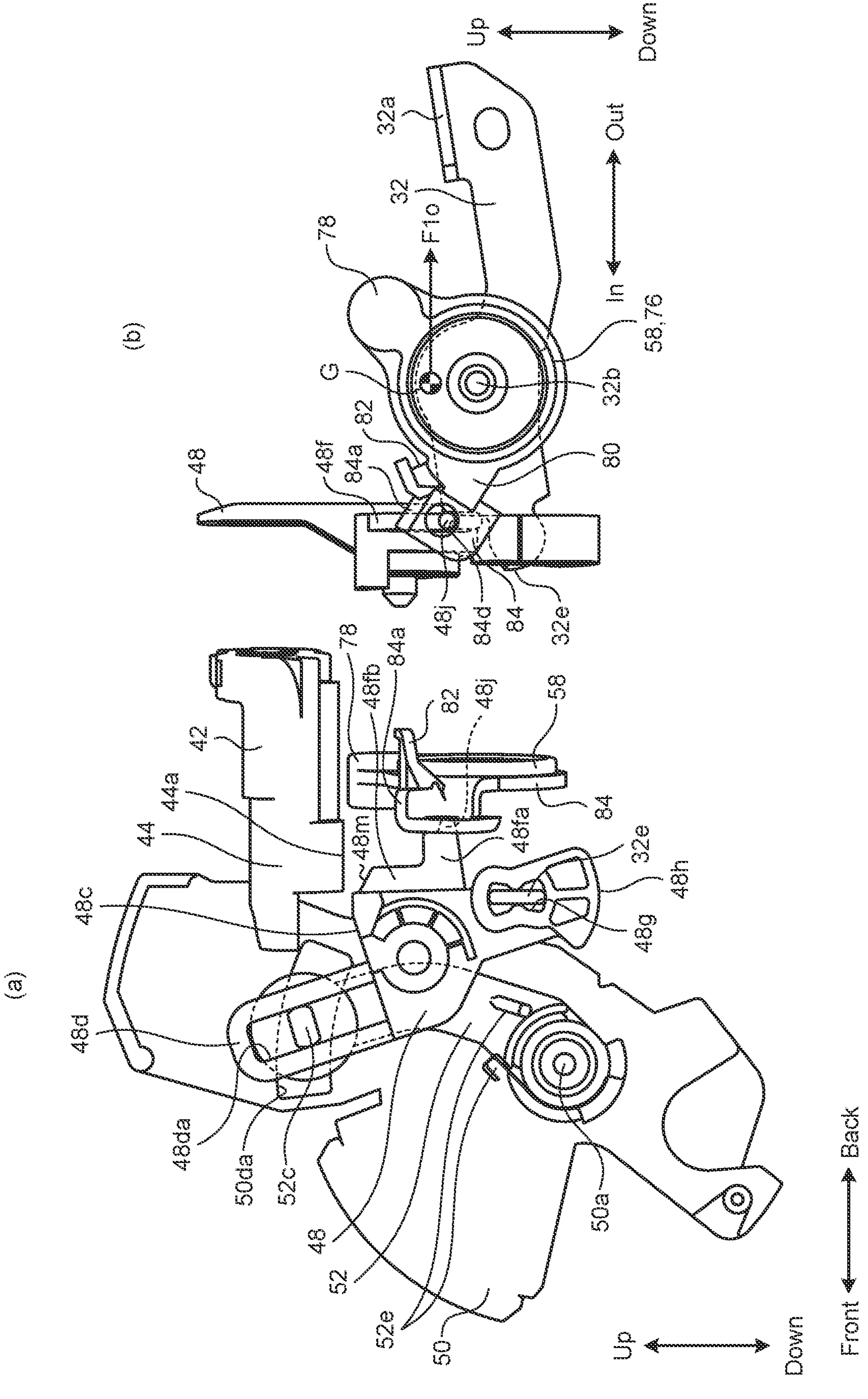
FIG. 14 is a schematic illustrating a positional relation of the inertia lever, the open link, the lock lever, and the ratchet, after the open link has been returned, by the elastic force, a little further in the clockwise direction from the configuration illustrated in FIG. 13, and after the protrusion has become fitted inside of the fitting hole, where (a) is a side view, and (b) is a rear view.

FIG. 14 is a schematic illustrating a positional relation of the inertia lever 58, the open link 48, the lock lever 50, and the ratchet 42, after the open link 48 has been returned, by the elastic force, a little further in the clockwise direction from the configuration illustrated in FIG. 13, and after the protrusion 48*j* has become fitted inside the fitting hole 84*d*. As illustrated in FIG. 14, as the elastic force of the spring 52*e* causes the open link 48 to return slightly in the clockwise direction, the protrusion 48*j* becomes fitted inside of the fitting hole 84*d*, and is brought into abutment against the inner surface of the bottom end of the fitting hole 84*d*. Because the open link 48 is returned in the clockwise direction, by being accelerated by the elastic force of the spring 52*e*, the protrusion 48*j* presses the fitting hole 84*d* at a moderately strong force, and this force suppresses the rotation of the inertia lever 58. At this point in time, because the inertia lever 58 has rotated by some angle from the standby position, and the elastic force of the compressed spring 86 has been somewhat increased, and has become capable of suppressing the rotation, the inertia lever 58 is prevented from rotating too far, even with a large inertial force F1*o* exerted.

At this point in time, the center of gravity G is almost immediately above the shaft 32*b*. From the initial configuration illustrated in FIG. 10, the center of gravity G has been displaced almost horizontally but almost none in the up-and-down direction. Therefore, the center of gravity G exerts an effect of rotating the inertia lever 58 by receiving the inertial force F1*o*, but almost no effect to rotate the inertia lever 58 by the weight of itself.

Because the diameter of the fitting hole 84*d* is set smaller than the length of the tip of the bottom part 48*fa* of the protruding piece 48*f* (see FIG. 5) in the up-and-down direction, only the protrusion 48*j* becomes fitted inside of the fitting hole 84*d*, and the engaging plane 48*k* is brought into an abutment against the bottom end of the curved surface 84*c* or the upper end of the acting surface 84*b*. The configuration illustrated in FIG. 13 transits to that illustrated in FIG. 14 in sufficiently short time.

Figure 15:
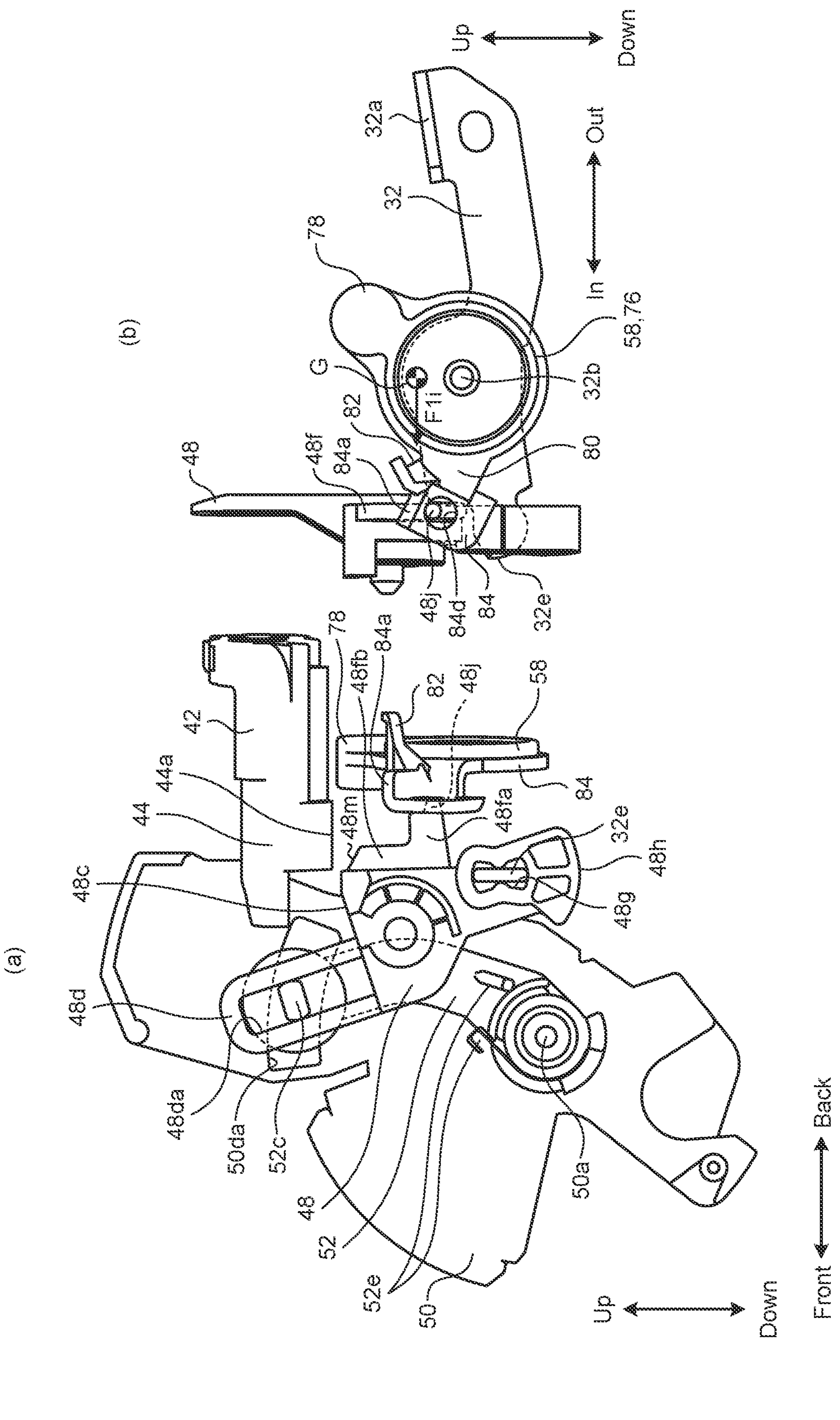
FIG. 15 is a schematic illustrating a positional relation of the inertia lever, the open link, the lock lever, and the ratchet in an inertia engagement configuration in which the inertia lever is engaged with the open link, after the inertia has stopped being exerted, where (a) is a side view, and (b) is a rear view.

FIG. 15 is a schematic illustrating a positional relation of the inertia lever 58, the open link 48, the lock lever 50, and the ratchet 42 in the inertia engagement configuration in which the inertia lever 58 is engaged with the open link 48, after the inertia has stopped being exerted. As illustrated in FIG. 15, because the inertia lever 58 is receiving the force of the spring 86 (see FIG. 8) in the counter-clockwise direction, once the inertial force F1*o* stops being exerted, the inertia lever 58 stops swinging in the clockwise direction, and becomes rotated in the counter-clockwise direction. At this time, because the protrusion 48*j* of the open link 48 is fitted inside the fitting hole 84*d*, the protrusion 48*j* becomes displaced relatively upwards inside the fitting hole 84*d*, and is brought into abutment against the inner surface of the upper end of the fitting hole 84*d*. This configuration is referred to as an inertia engagement configuration.

Figure 16:
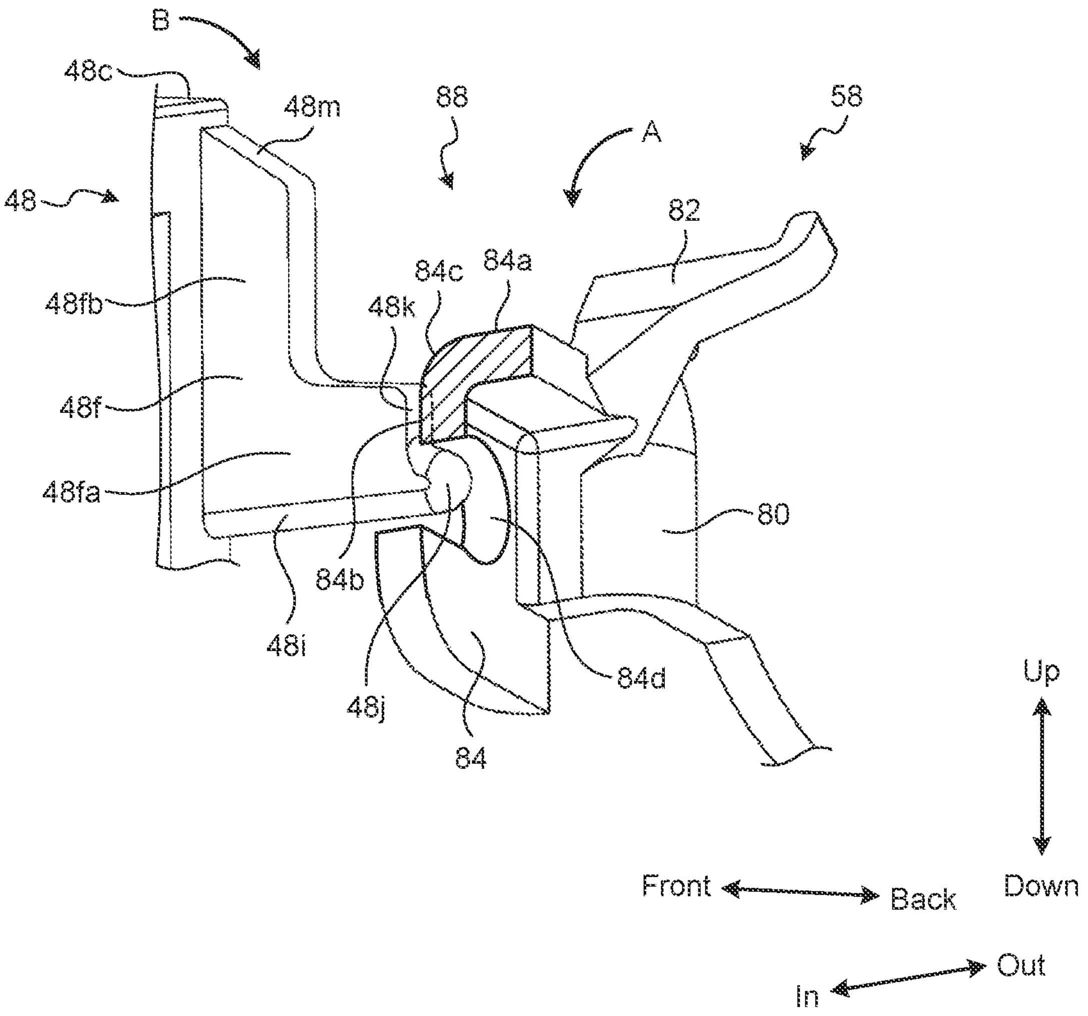
FIG. 16 is a partial enlarged cross-sectional view of a protruding piece and an acting piece in the inertia engagement configuration.

FIG. 16 is a partial enlarged cross-sectional view of the protruding piece 48*f* and the acting piece 84 in the inertia engagement configuration. At this time, as illustrated in FIG. 16, the protrusion 48*j* of the protruding piece 48*f* has fitted inside the fitting hole 84*d*, and almost the entire surface of the engaging plane 48*k* has been brought into abutment against the inner side of the upper portion of the acting surface 84*b* of the acting piece 84. The engaging plane 48*k* and the acting surface 84*b* both extend along a surface perpendicular to the front-and-back direction, and are kept in abutment against each other stably without any space therebetween.

Furthermore, this engagement is positioned at a level higher than the inner coupling part 32*e* about which the open link 48 swings and the shaft 32*b* that is the rotational center of the inertia lever 58. The inertia lever 58 is biased by the elastic force of the spring 86 in the direction of the arrow A, and the acting piece 84 is receiving a downward force. By contrast, the open link 48 is biased by the elastic force of the spring 52*e* in the direction of the arrow B, and the protruding piece 48*f* is receiving a force in a direction diagonally downwards toward the rear side. The rotating direction of the arrow A and the rotating direction of the arrow B are in the directions intersecting each other in the space, and the engaging plane 48*k* presses a part of the acting surface 84*b*, and has its movement restricted by the acting surface 84*b*. The inner surface of the upper end of the fitting hole 84*d* presses the protrusion 48*j*, and has its movement restricted by the protrusion 48*j*. Therefore, the protruding piece 48*f* and the acting piece 84 engage with each other, and together form an engaging mechanism 88.

This position of the open link 48 is established as an inertia engaging position. The inertia engaging position is a position substantially in the middle between the unlocking position and the locking position. Because, when the open link 48 is at the inertia engaging position, the movement of the outer lever 32 is disabled, in the manner described below, the inertia engaging position can be said to be the locking position in a broader sense. The inertia lever 58 in the inertia engagement configuration is at the blocking position. In other words, in the inertia engagement configuration, the inertia lever 58 is held at the blocking position, and the open link 48 is held at the inertia engaging position. The anti-panic lever 52 is at a position returned slightly from the anti-panic position in the clockwise direction.

Returning to FIG. 15, in this inertia engagement configuration, the open link 48 is quite inclined from the unlocking position illustrated in FIG. 10, and the pressing table 48*c* has moved out of the area below the pressed portion 44*a* of the release lever 44, but the slanted auxiliary abutment surface 48*m* is the area below the pressed portion 44*a*.

When the vehicle experiences a lateral collision, there is a risk for the outer handle being moved by the inertia, and for the outer lever 32 being rotated in a manner associated with the outer handle. There is also a risk for the outer lever 32 being rotated by the effect of a deformation of the door at the time of a collision. If the outer lever 32 is rotated, the inner coupling part 32*e* moves up. However, even when the vehicle experiences a lateral collision, because the actions described above keep the open link 48 at the inertia engaging position, the pressing table 48*c* is not brought into abutment against the pressed portion 44*a*, so that the ratchet 42 does not rotate and keeps the door closed.

Furthermore, there are some cases in which, although the outward inertial force F1*o* has stopped being exerted in this configuration, an airbag is caused to operate within a short time period. When an airbag inflates and the door receives a force from the inner side, an inward inertial force Fli is exerted to the door lock device 10, as a counteraction to the force. This inertial force Fli affects the center of gravity G of the inertia lever 58. A rotational moment in the counter-clockwise direction is then generated in the inertia lever 58, but because the protrusion 48*j* is inside the fitting hole 84*d* and restricting the downward movement of the acting piece 84, the inertia lever 58 is kept unrotated, and the inertia lever 58 and the open link 48 are kept at their respective positions. Therefore, the door is kept closed even if the open link 48 is moved upwards subsequently.

When the open link 48 is moved upwards at the inertia engaging position, the auxiliary abutment surface 48*m* is brought into abutment against the pressed portion 44*a*, but does not push up the pressed portion 44*a* because the auxiliary abutment surface 48*m* is slanted, in the manner described below.

Figure 17:
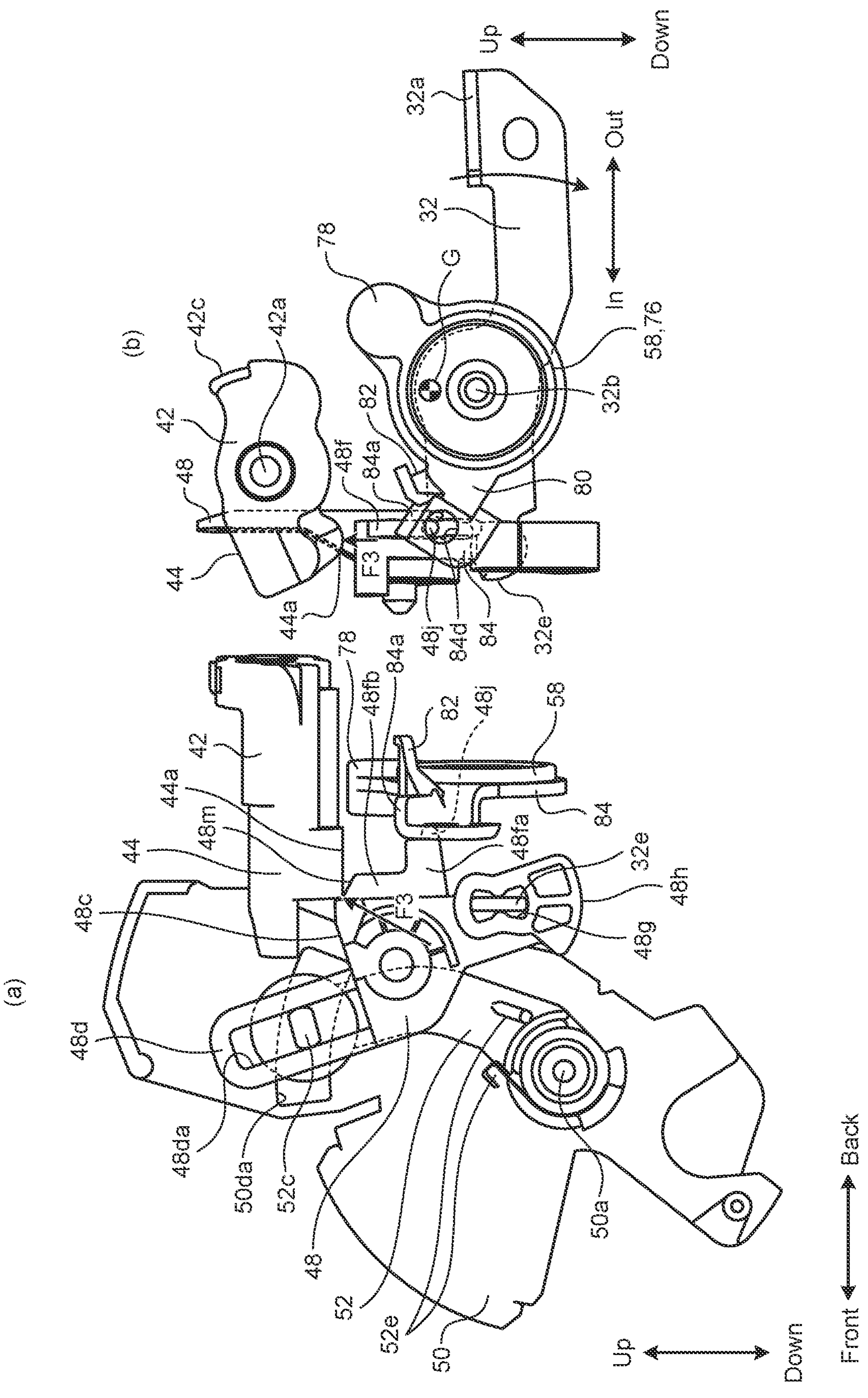
FIG. 17 is a schematic illustrating a positional relation of the inertia lever, the open link, the lock lever, and the ratchet, when the auxiliary abutment surface is brought into abutment against the release lever, as a result of the open link being moved up by a movement of the outer lever, from the configuration illustrated in FIG. 15, where (a) is a side view, and (b) is a rear view.

FIG. 17 is a schematic illustrating a positional relation of the inertia lever 58, the open link 48, the lock lever 50, and the ratchet 42, when the auxiliary abutment surface 48*m* is brought into abutment against the pressed portion 44*a* of the release lever 44, as a result of the open link 48 being moved up by the movement of the outer lever 32, from the configuration illustrated in FIG. 15.

The door lock device 10 prevents the door from opening when the vehicle experiences a lateral collision, but then makes the door openable to a human-induced opening handle operation. When an opening handle operation is performed, the outer lever 32 is caused to rotate as illustrated in FIG. 17, and the open link 48 is caused to move up accordingly, and the portion near the top end of the auxiliary abutment surface 48*m* is brought into abutment against an end of the pressed portion 44*a* of the release lever 44. The auxiliary abutment surface 48*m* applies a force F3 to the pressed portion 44*a*, but because the auxiliary abutment surface 48*m* is slanted, the force F3 is exerted in a diagonal direction, accordingly. Therefore, even if the force F3 is somewhat large, its component in the vertical direction is small, and is incapable of pushing up the release lever 44.

Furthermore, because the protrusion 48*j* is inside the fitting hole 84*d*, as the open link 48 and the protruding piece 48*f* are moved upwards, the acting piece 84 is pushed up, and the inertia lever 58 is rotated in the clockwise direction.

Figure 18:
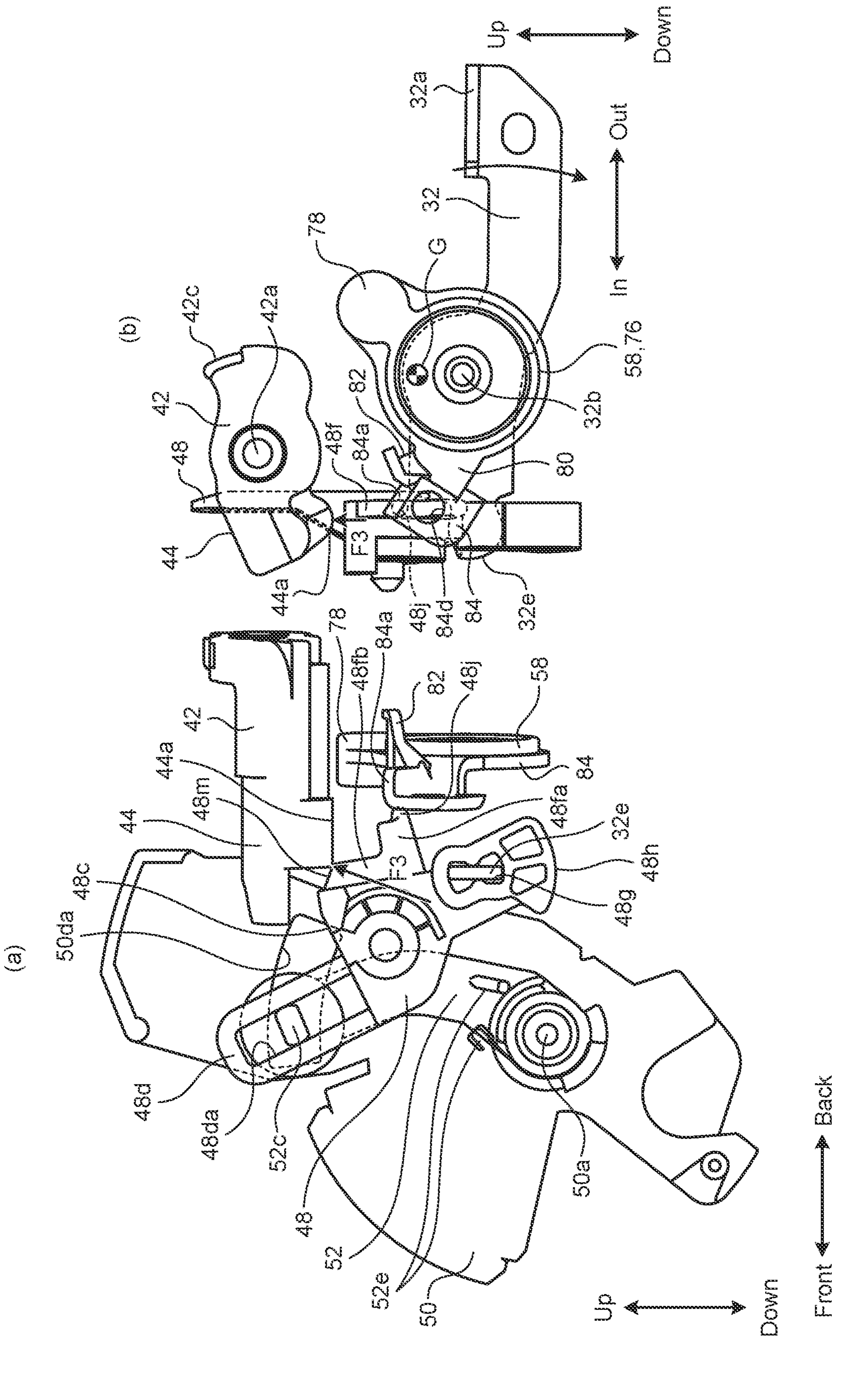
FIG. 18 is a schematic illustrating a positional relation of the inertia lever, the open link, the lock lever, and the ratchet, after the open link has been moved further upwards from the configuration illustrated in FIG. 17, where (a) is a side view, and (b) is a rear view.

FIG. 18 is a schematic illustrating a positional relation of the inertia lever 58, the open link 48, the lock lever 50, and the ratchet 42 after the open link 48 has been moved further upwards from the configuration illustrated in FIG. 17. As illustrated in FIG. 18, when the inner coupling part 32*e* and the open link 48 are moved further upwards, because the auxiliary abutment surface 48*m* is slanted, the auxiliary abutment surface 48*m* is brought into a sliding contact with the end of the pressed portion 44*a*, and the open link 48 is caused to swing further. The abutting end of the pressed portion 44*a* then reaches the lower end of the auxiliary abutment surface 48*m*.

As the open link 48 and the protruding piece 48*f* are moved upwards, the acting piece 84, too, is also pushed upwards. However, because the open link 48 has swung by a larger angle, the protrusion 48*j* becomes, while moving upwards, displaced somewhat forwardly, and starts coming out of the fitting hole 84*d*. At this point in time, the open link 48 is at or near the locking position, and the anti-panic lever 52 is at or near the anti-panic position.

Figure 19:
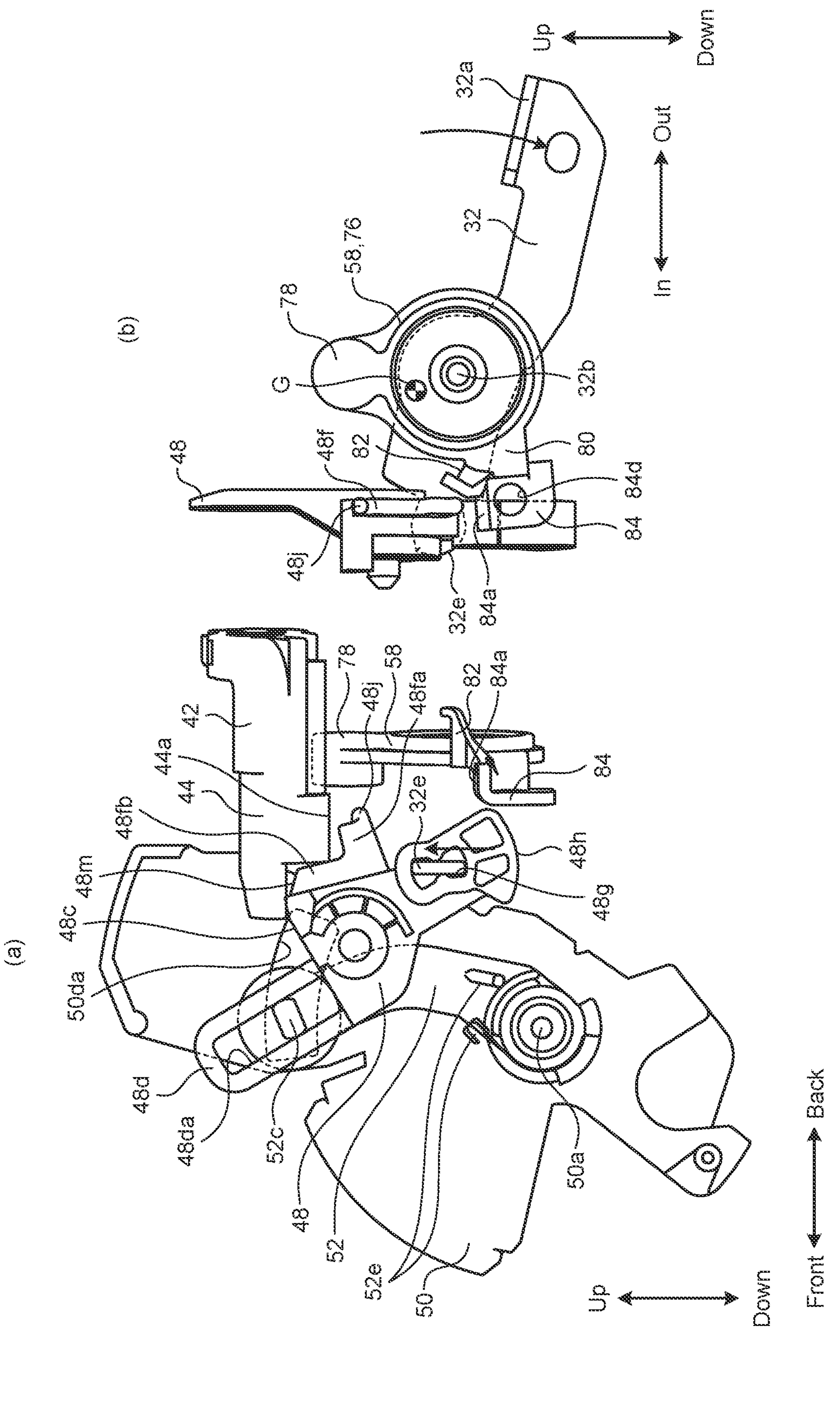
FIG. 19 is a schematic illustrating a positional relation of the inertia lever, the open link, the lock lever, and the ratchet, after the engagement has been released, and the inertia lever has been returned to the standby position from the configuration illustrated in FIG. 18, where (a) is a side view, and (b) is a rear view.

FIG. 19 is a schematic illustrating a positional relation of the inertia lever 58, the open link 48, the lock lever 50, and the ratchet 42, after the engagement has been released, and the inertia lever 58 has been returned to the standby position, from the configuration illustrated in FIG. 18. As illustrated in FIG. 19, when the outer lever 32 becomes rotated to a given rotation restricting portion, the inner coupling part 32*e* is also moved up to a given upper bound height. This causes the open link 48 to move further upwards and to swing to the locking position. As the open link 48 comes to the locking position, the auxiliary abutment surface 48*m* moves away from the pressed portion 44*a*, and the pressed portion 44*a* moves inside of the L-shaped bent portion of the protruding piece 48*f*. This configuration illustrated in FIG. 19 is substantially the same as the configuration illustrated in FIG. 6(*d*) that is a configuration with the anti-panic function enabled.

As the open link 48 moves up and swings, the protrusion 48*j* also becomes displaced diagonally frontwards and upwards, and are moved out of the range of the movement trajectory of the acting piece 84. Therefore, the protrusion 48*j* comes out of the fitting hole 84*d*, releasing the engagement of the protruding piece 48*f* and the acting piece 84, and causing the elastic force of the spring 86 to rotate the inertia lever 58 back to the initial position in the counter-clockwise direction. By ending the opening handle operation, the outer lever 32 is also returned to the initial position, and the open link 48 is returned to the unlocking position. Illustrated in FIGS. 17 to 19 is an engagement releasing operation using the outer lever 32, but the engagement may also be released in the same manner, using the inner lever 54.

Furthermore, when the door is closed hard at approximately 5 m/s, an inertial force of approximately 100G is exerted (about 30G at 1.8 m/s) at the end of the door. Therefore, even with a strong closing operation within the scope of an ordinary operation, there is a chance that the inertia lever 58 is caused to move the blocking position and become engaged with the protruding piece 48*f* of the open link 48, and to form the inertia engagement configuration (see FIG. 16). In this case, too, the engagement can be released by operating the outer handle or the inner handle.

To open the door subsequently, the engagement of the striker S with the latch 40 can be released by operating the outer handle or the inner handle in the ordinary fashion so that the outer lever 32 or the inner lever 54 is rotated and causes the open link 48 to rotate via the ratchet 42.

In the manner described above, in the door lock device 10 according to the embodiment, when an inertial force F1*o* equal to or greater than a set value is exerted while the open link 48 is at the unlocking position, the inertia rotates the inertia lever 58 against the biasing force of the spring 86, and the acting piece 84 is caused to push up the protrusion 48*j*. As the protrusion 48*j* pushes up the acting piece 84, the open link 48 is caused to swing against the biasing force of the spring 52*e*. The protrusion 48*j* then becomes fitted inside the fitting hole 84*d*, to achieve the inertia engagement configuration in which the inertia lever 58 is kept at the blocking position and the open link 48 is kept at the inertia engaging position.

Because, in this inertia engagement configuration, the protrusion 48*j* is inside the fitting hole 84*d*, even when the inertial force F1*o* and the inertial force F1*i* in both directions are exerted on the door, the door can be kept unopenable reliably. Furthermore, when the outer handle or the inner handle is operated subsequently, the open link 48 is caused to move upwards and swing to the locking position, to release the inertia engagement configuration and to return to the initial configuration (with the open link 48 at the unlocking position and the inertia lever 58 is at the standby position), and to make the door openable.

Furthermore, the door lock device 10 is provided with the anti-panic mechanism 69 (see FIG. 6) that includes the anti-panic lever 52. The anti-panic lever 52 can be at the cooperating position and the anti-panic position, with respect to the lock lever 50. When the inertial force F1*o* is exerted in the initial configuration, causes the open link 48 to swing via the inertia lever 58, the anti-panic lever 52 is also caused to swing, because the inward protrusion 52*c* is fitted inside of the guide hole 48*da*. However, because the anti-panic lever 52 is relatively swingable with respect to the lock lever 50, the lock lever 50 remains unmoved (see FIG. 15). Therefore, regardless of the position of the lock lever 50, the anti-panic lever 52 can be brought to the inertia engagement configuration. Furthermore, the transition to the inertia engagement configuration can be achieved only through the displacement of the anti-panic lever 52, without giving any effect to the lock lever 50.

The inertia engagement configuration is achieved by the elastic force of the two springs 86 and 52*e*. Furthermore, when the inertia engagement configuration is to be released, the elastic force of the spring 52*e* is exerted on the open link 48 via the anti-panic lever 52, and causes the open link 48 to rotate in the clockwise direction and to return to the initial position (see FIG. 19). The spring 52*e* used in the anti-panic mechanism 69 is used effectively to achieve and to release the inertia engagement configuration. In other words, in the door lock device 10, the functions of the anti-panic mechanism 69 and the engaging mechanism 88 (see FIG. 16) complement each other, by organically working with each other.

The present invention is not limited to the embodiment described above, and it should be needless to say that the embodiment may be modified in any way, within the scope not deviating from the spirit of the present invention.

REFERENCE SIGNS LIST

10 door lock device
32 outer lever
32*c* spring

32*b* shaft (outer lever shaft)
32*e* inner coupling part
38*a*, 14*a*, 14*b* coaxial cylinder
40 latch
40*a* shaft (latch shaft)
42 ratchet
42*a* shaft (ratchet shaft)
44 release lever
44*a* pressed portion
48 open link
48*c* pressing table
48*f* protruding piece
48*fa* lower part
48*g* coupling hole
48*j* protrusion
48*k* engaging plane (second engaging surface)
48*m* auxiliary abutment surface
50 lock lever
50*a* shaft
50*b* downwardly extending portion
50*d* upwardly extending portion
50*da* arc-shaped hole
52 anti-panic lever
52*c* inward protrusion
52*d* outward protrusion
52*e* spring (first elastic member)
54 inner lever
54*d* pressing table
56 self-cancelling lever
58 inertia lever
76 ring
78 weight
80 arm
82 spring keeper
84 acting piece
84*a* pressing surface
84*b* acting surface (first engaging surface)
84*c* curved surface
84*d* fitting hole
86 spring (second elastic member)
F1*i*, F1*o* inertial force
G center of gravity
S striker

The invention claimed is:

1. A door lock device comprising:

a latch that is pivotably supported by a latch shaft, and configured to engage with a striker for closing a door of a vehicle;

a ratchet configured to keep the latch engaged with the striker;

an outer lever that is pivotably supported by an outer lever shaft, and configured to link with an outer handle;

an open link that is displaceable between an unlocking position, a locking position, and an inertia engaging position that is between the unlocking position and the locking position by swinging, the open link being configured to communicate a movement of the outer lever to the ratchet, thereby causing the ratchet to release an engagement of the latch, when the open link is at the unlocking position, and disable the movement of the outer lever, when the open link is at the locking position or the inertia engaging position;

a first elastic member configured to bias the open link toward the unlocking position;

an inertia lever that is displaceable between a standby position and a blocking position by rotating along a plane perpendicular to a plane where the open link swings, the inertia lever having a center of gravity decentered from a rotational axis thereof;

a second elastic member configured to bias the inertia lever toward the standby position;

a fitting hole that is provided to an acting piece protruding from the inertia lever; and a protrusion that is provided to the open link, and configured to project into a range of a trajectory of a movement of the fitting hole while the open link is at the unlocking position, wherein when an inertial force equal to or greater than a set value is exerted in a direction from an interior to an exterior of a cabin of the vehicle while the open link is at the unlocking position, the inertial force causes the inertia lever to rotate against a biasing force of the second elastic member, the acting piece is caused to press the protrusion, the open link is caused to swing against a biasing force of the first elastic member by the protrusion being pressed by the acting piece, and the protrusion becomes fitted inside the fitting hole which achieves an inertia engagement configuration in which the inertia lever is kept at the blocking position and the open link is kept at the inertia engaging position.

2. The door lock device according to claim 1, wherein, when an operation for opening the door is performed on the outer handle in the inertia engagement configuration, the open link is caused to swing further toward the locking position, the protrusion is caused to come out of the fitting hole, and the inertia lever returns to the standby position by the biasing force of the second elastic member.

3. The door lock device according to claim 1, wherein the outer lever and the inertia lever are coaxial and independently rotatable, and the inertia lever includes a weight having a center of gravity decentered from the rotational axis.

4. The door lock device according to claim 2, wherein the outer lever and the inertia lever are coaxial and independently rotatable, and the inertia lever includes a weight having a center of gravity decentered from the rotational axis.

5. The door lock device according to claim 1, wherein the acting piece includes a first engaging surface provided around the fitting hole, the open link includes a second engaging surface that is provided on an opposite side of a pressed surface of the acting piece in the protrusion, and the inertia engagement configuration is achieved by causing the first engaging surface and the second engaging surface to press each other.

6. The door lock device according to claim 2, wherein the acting piece includes a first engaging surface provided around the fitting hole, the open link includes a second engaging surface that is provided on an opposite side of a pressed surface of the acting piece in the protrusion, and the inertia engagement configuration is achieved by causing the first engaging surface and the second engaging surface to press each other.

7. The door lock device according to claim 1, further comprising:

a lock lever configured to switch between an unlocking biased position where the open link is positioned at the unlocking position, and a locking biased position where the open link is positioned at the locking position; and an anti-panic lever configured to displace relatively to the lock lever, be displaceable between a cooperating position and an anti-panic position, and communicate a displacement of the lock lever to the open link, when the anti-panic lever is at the cooperating position, wherein when the outer lever is moved while the lock lever is at the locking biased position and the open link is at the locking position, the anti-panic lever moves relatively from the cooperating position to the anti-panic position, thereby permitting the lock lever to become displaced to the unlocking biased position, and returns from the anti-panic position to the cooperating position when the operation of the outer lever is ended, and when the inertial force causes the inertial lever to swing the open link, the open link and the anti-panic lever are caused to swing integrally, while the lock lever is kept at the unlocking biased position.

8. The door lock device according to claim 2, further comprising:

a lock lever configured to switch between an unlocking biased position where the open link is positioned at the unlocking position, and a locking biased position where the open link is positioned at the locking position; and an anti-panic lever configured to displace relatively to the lock lever, be displaceable between a cooperating position and an anti-panic position, and communicate a displacement of the lock lever to the open link, when the anti-panic lever is at the cooperating position, wherein when the outer lever is moved while the lock lever is at the locking biased position and the open link is at the locking position, the anti-panic lever moves relatively from the cooperating position to the anti-panic position, thereby permitting the lock lever to become displaced to the unlocking biased position, and returns from the anti-panic position to the cooperating position when the operation of the outer lever is ended, and when the inertial force causes the inertial lever to swing the open link, the open link and the anti-panic lever are caused to swing integrally, while the lock lever is kept at the unlocking biased position.

9. The door lock device according to claim 7, wherein the anti-panic lever is biased toward the cooperating position by the first elastic member.

10. The door lock device according to claim 8, wherein the anti-panic lever is biased toward the cooperating position by the first elastic member.

* * * * *